United States Patent
Jin et al.

(10) Patent No.: US 9,958,983 B2
(45) Date of Patent: May 1, 2018

(54) MOBILE TERMINAL AND METHOD FOR CONTROLLING THE SAME

(71) Applicant: LG ELECTRONICS INC., Seoul (KR)

(72) Inventors: Dongchul Jin, Seoul (KR); Haengchul Kwak, Seoul (KR); Youngsok Lee, Seoul (KR); Yehan Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 85 days.

(21) Appl. No.: 14/952,695

(22) Filed: Nov. 25, 2015

(65) Prior Publication Data
US 2016/0147371 A1  May 26, 2016

(30) Foreign Application Priority Data
Nov. 25, 2014  (KR) .................. 10-2014-0165540

(51) Int. Cl.
*G06F 3/041* (2006.01)
*G06F 1/32* (2006.01)
*G06F 3/0488* (2013.01)

(52) U.S. Cl.
CPC .......... *G06F 3/0416* (2013.01); *G06F 1/3265* (2013.01); *G06F 3/0412* (2013.01); *G06F 3/04883* (2013.01); *Y02B 60/1242* (2013.01)

(58) Field of Classification Search
USPC ................................................ 345/173, 174
See application file for complete search history.

(56) References Cited

U.S. PATENT DOCUMENTS

| 2010/0253639 A1* | 10/2010 | Huang | G06F 3/0412 345/173 |
| 2010/0265199 A1* | 10/2010 | Chen | G06F 1/3203 345/173 |
| 2012/0306811 A1* | 12/2012 | Farmer | G06F 1/3218 345/174 |

(Continued)

FOREIGN PATENT DOCUMENTS

| EP | 2857932 A1 | 4/2015 |
| KR | 101444091 B1 | 9/2014 |

OTHER PUBLICATIONS

European Patent Office Application No. 15195930.1, Search Report dated Apr. 6, 2016, 9 pages.

*Primary Examiner* — Jennifer Mehmood
*Assistant Examiner* — Deeprose Subedi
(74) *Attorney, Agent, or Firm* — Lee, Hong, Degerman, Kang & Waimey

(57) ABSTRACT

A mobile terminal includes a display; a touch sensor coupled to the display, the touch sensor including a first sensor and a second sensor; a driving unit configured to supply power to drive the display; and a touch controller configured to: cause the driving unit to enter an inactive state when a lighting of the display is turned off; recognize a touch input applied to the display by sensing, via the first or second sensor, the touch input applied while the lighting of the display is off; cause the driving unit to enter an active state in response to the touch input, the active state maintained while the lighting of the display is on; and obtain touch coordinates of the touch input using input from both the first sensor and the second sensor together when the driving unit enters the active state.

15 Claims, 15 Drawing Sheets

(56) References Cited

U.S. PATENT DOCUMENTS

| | | | |
|---|---|---|---|
| 2013/0113727 A1* | 5/2013 | Lin | G06F 1/3262 345/173 |
| 2013/0222295 A1* | 8/2013 | Lim | G06F 3/041 345/173 |
| 2013/0321382 A1 | 12/2013 | Nagao | |
| 2013/0328829 A1* | 12/2013 | Lee | G06F 3/0412 345/174 |
| 2014/0159614 A1* | 6/2014 | Hussain | H05B 33/086 315/307 |

* cited by examiner

FIG. 3A(a)
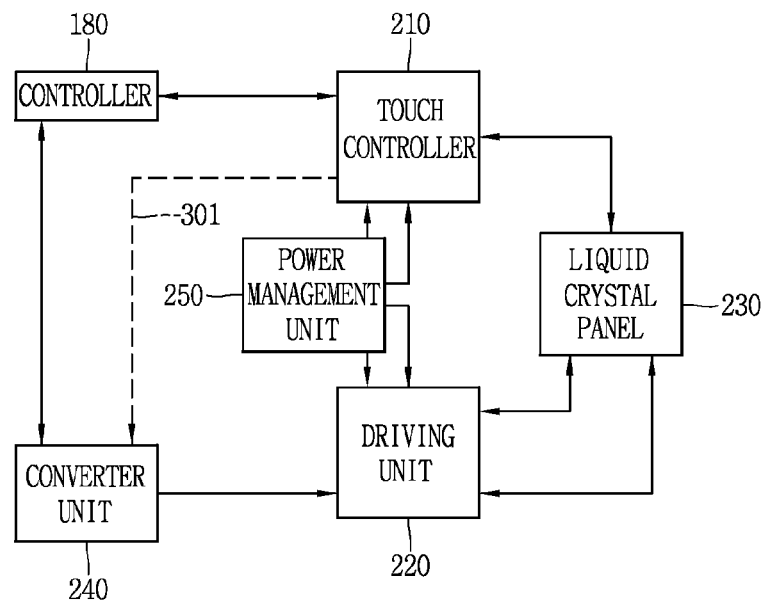
FIG. 3A(b)
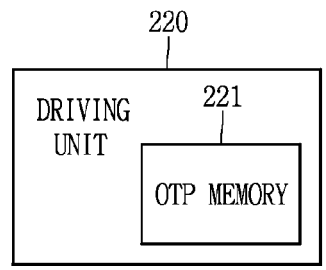
FIG. 3B(a)  FIG. 3B(b)
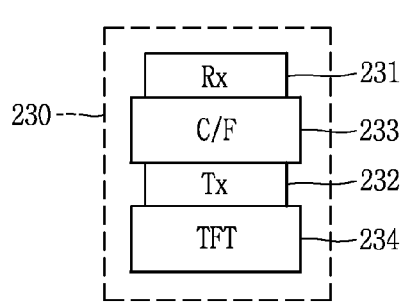 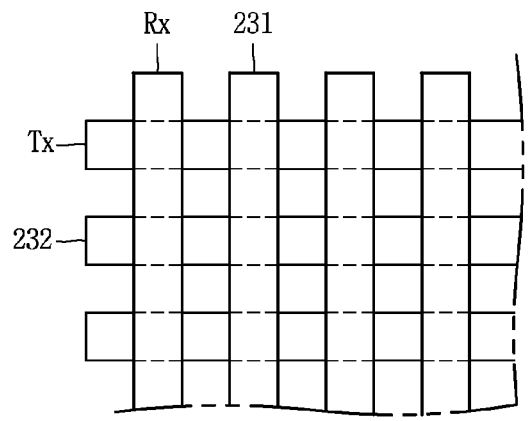

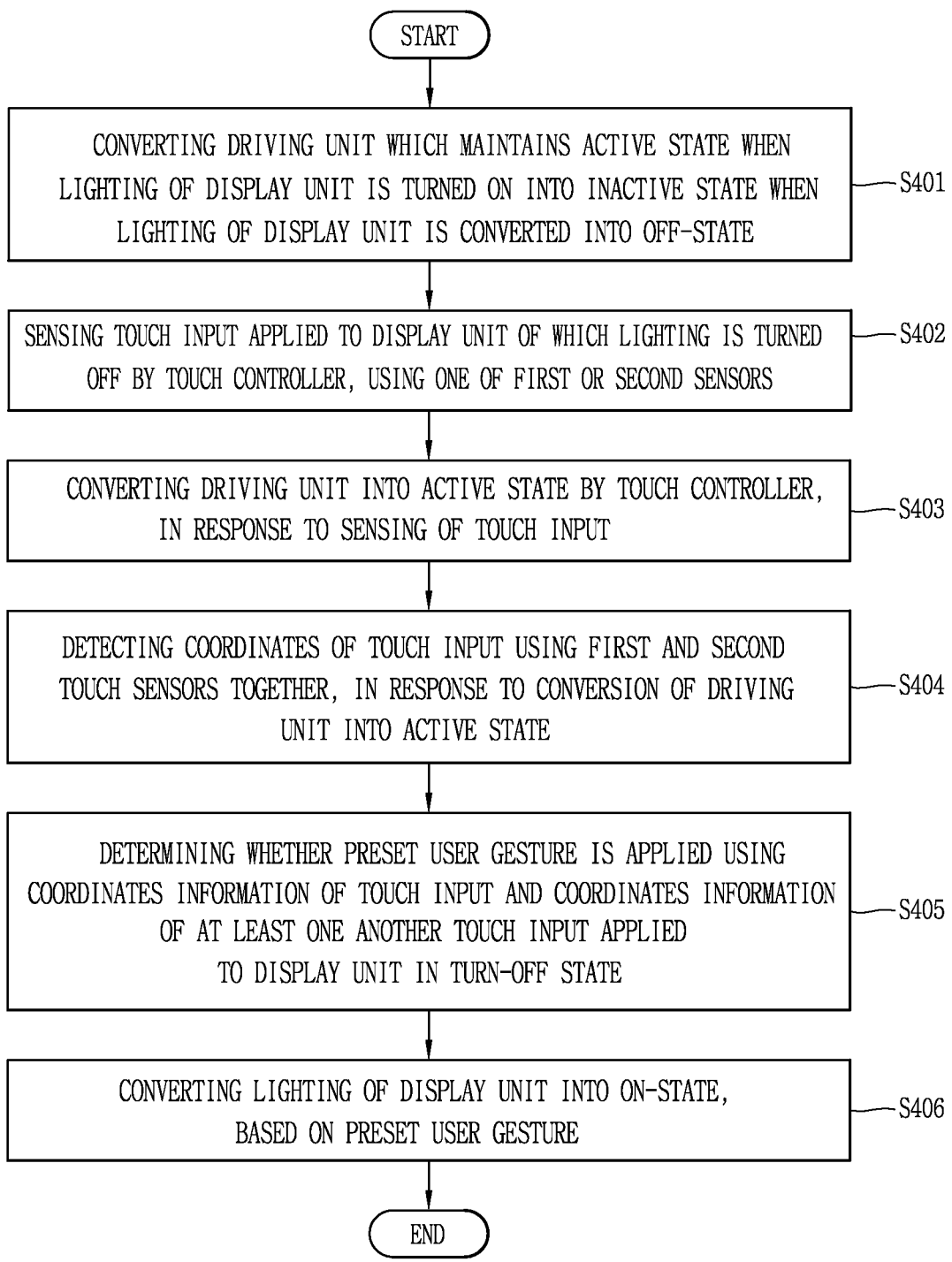

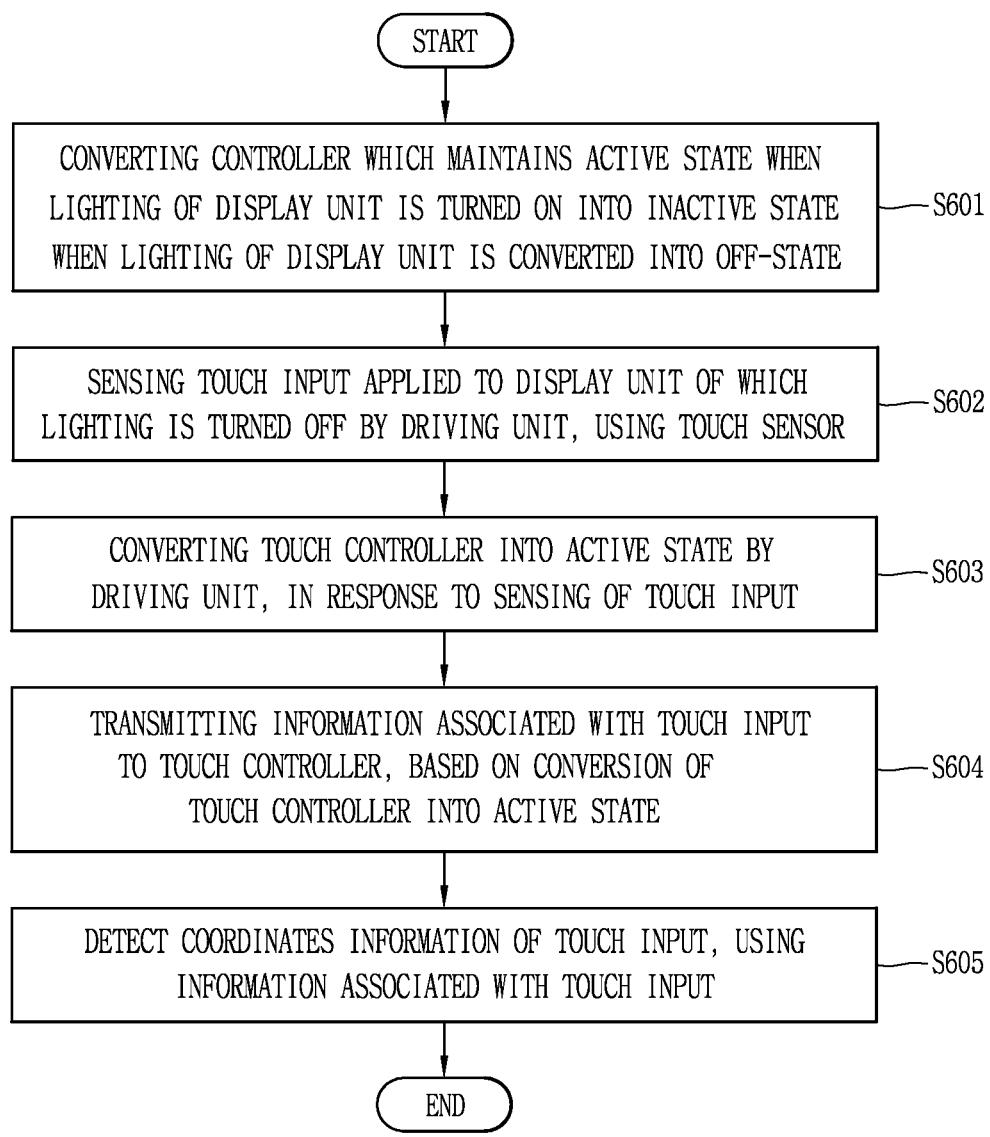

MOBILE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Patent Application No. 10-2014-0165540, filed on Nov. 25, 2014, the contents of which is incorporated by reference herein in its entirety.

BACKGROUND

1. Field

The present invention relates to a mobile terminal including an in-cell touch type display, and a method for controlling the same.

2. Description of the Conventional Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components. For instance, a user interface to search or select a desired function in an easy and convenient manner is provided.

In addition, the display unit of the mobile terminal includes a liquid crystal display panel implementing a picture by operating a switching element provided on a plurality of signal wirings and a cross point thereof, a detection circuit (Touch IC) for detecting a touch input, and a driving circuit (Driving IC) for controlling the liquid crystal panel, and requires a separate light source such as a backlight unit.

Particularly, as for the display used in a device such as the mobile terminal, rather than a conventional interface device such as a keyboard and a remote controller, a touch panel which is configured to directly select an input to a region of a screen with a finger or stylus pen has been widely used in order to select a predetermined object or region indicated on the screen.

The touch panel may be divided into an add-on touch type that is separately manufactured from the liquid crystal panel and attached to the liquid crystal panel and an in-cell touch type in which touch electrodes and wirings are directly formed on a substrate of the liquid crystal panel as an integrated panel, and particularly an in-cell touch type display is highlighted due to its sensitive touch feeling, simplified manufacturing process and a reduced thickness.

However, there is a disadvantage in that the in-cell touch type display consumes higher power to operate the detection circuit and the driving circuit compared to power consumption by the add-on touch type display.

SUMMARY

It is an object of the present invention to provide a mobile terminal and a method for controlling the same capable of sensing a touch input in a state that an in-cell touch type display unit is inactivated.

It is another object of the present invention to provide a mobile terminal and a method for controlling the same capable of executing an application mapped to a specific region when a preset touch input is received at a specific region of a touch screen in a sleep mode.

To achieve these and other advantages and objects of the present invention, there is provided a mobile terminal including a display; a touch sensor coupled to the display, the touch sensor including a first sensor and a second sensor; a driving unit configured to supply power to drive the display; and a touch controller configured to: cause the driving unit to enter an inactive state when a lighting of the display is turned off; recognize a touch input applied to the display by sensing, via the first or second sensor, the touch input applied while the lighting of the display is off; cause the driving unit to enter an active state in response to the touch input, the active state maintained while the lighting of the display is on; and obtain touch coordinates of the touch input using input from both the first sensor and the second sensor together when the driving unit enters the active state.

In one embodiment, a pulse voltage is applied to only one of the first sensor and the second sensor when the driving unit is in the inactive state.

In one embodiment, a pulse voltage is applied to both the first sensor and the second sensor when the driving unit enters the active state from the inactive state.

In one embodiment, a pulse voltage of the first sensor is applied by the touch controller, and a pulse voltage of the second sensor is applied by the driving unit, which enters the active state, based on sensing of the touch input using the first sensor.

In one embodiment, the display is turned on in response to a user gesture including at least the touch input; and the touch controller is further configured to determine whether the user gesture is applied based on coordinate information of the touch input and coordinate information of at least one second touch input that is applied while the display is off.

In one embodiment, each of the touch input and the at least one second touch input is a tapping applied to the display; and the user gesture is specified based on at least one of a region of the display where the tapping is applied, a time interval between each of a plurality of tapping, or a number of the plurality of tapping.

In one embodiment, the mobile terminal further includes a controller configured to control the mobile terminal in combination with at least one of the display, the touch controller, or the driving unit, and the controller is further configured to be operated in a sleep mode when the lighting of the display is turned off, and to enter an active mode in response to the user gesture.

In one embodiment, the controller is further configured to turn on the lighting of the display upon entering the active mode.

In one embodiment, the user gesture includes a plurality of user gestures which are specified by a position where the touch input and the at least one second touch input are applied; and the controller is further configured to: execute a first application when a first user gesture among the plurality of user gestures is applied; and execute a second application when a second user gesture among the plurality of user gestures is applied.

In one embodiment, the driving unit includes a memory in which initialization setting information associated with an initialization operation of the driving unit is stored; and the driving unit is further configured to perform the initialization operation using the initialization setting information stored in the memory upon entering the active state when the touch input is recognized by the touch controller.

In another embodiment, a display unit for a mobile terminal includes a display; a touch sensor configured to sense a touch input applied to the display while a lighting of the display is off; a driving unit configured to supply power to drive the display unit; and a touch controller configured to: recognize the sensed touch input; enter an inactive state when the lighting of the display is turned off; and maintain an active state while the lighting of the display is on. The driving unit is further configured to: cause the touch controller to enter the active state when the touch input is recognized; and cause transmission of information associated with the touch input to the touch controller, and wherein the touch controller in the active state is configured to detect coordinate information of the touch input, using the information associated with the touch input.

In yet another embodiment, a method for controlling a mobile terminal, which includes a display having a first touch sensor, a second touch sensor, a touch controller, and a driving unit, includes: causing the driving unit to enter an inactive state when a lighting of the display is turned off; recognizing, by the touch controller, a touch input applied to the display by sensing, via the first or second touch sensor, the touch input applied while the lighting of the display is off; causing, by the touch controller, the driving unit to enter an active state in response to the touch input, the active state maintained while the lighting of the display is on; and obtaining, by the touch controller, touch coordinates of the touch input using the first and second touch sensors together when the driving unit enters the active state.

BRIEF DESCRIPTION OF THE DRAWING

The present invention will become more fully understood from the detailed description given hereinbelow and accompanying drawings, which are given by illustration only, and thus are not limitative of the present invention, and wherein:

FIGS. 3A(a) and 3A(b) are block diagrams illustrating a method to detect a touch input in a state that the driving unit, the converter unit and the controller are turned off according to an embodiment of the present invention;

FIGS. 3B(a) and 3B(b) are diagrams illustrating features of the driving unit and the liquid crystal unit illustrated in FIGS. 3A(a) and 3A(b);

FIG. 4 is a flow-chart illustrating a control method of the terminal illustrated in FIGS. 3A(a) and 3A(b);

FIG. 6 is a flow-chart illustrating a control method of the terminal illustrated in FIGS. 5A(a), 5A(b), and 5A(c);

DETAILED DESCRIPTION OF EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 1A:
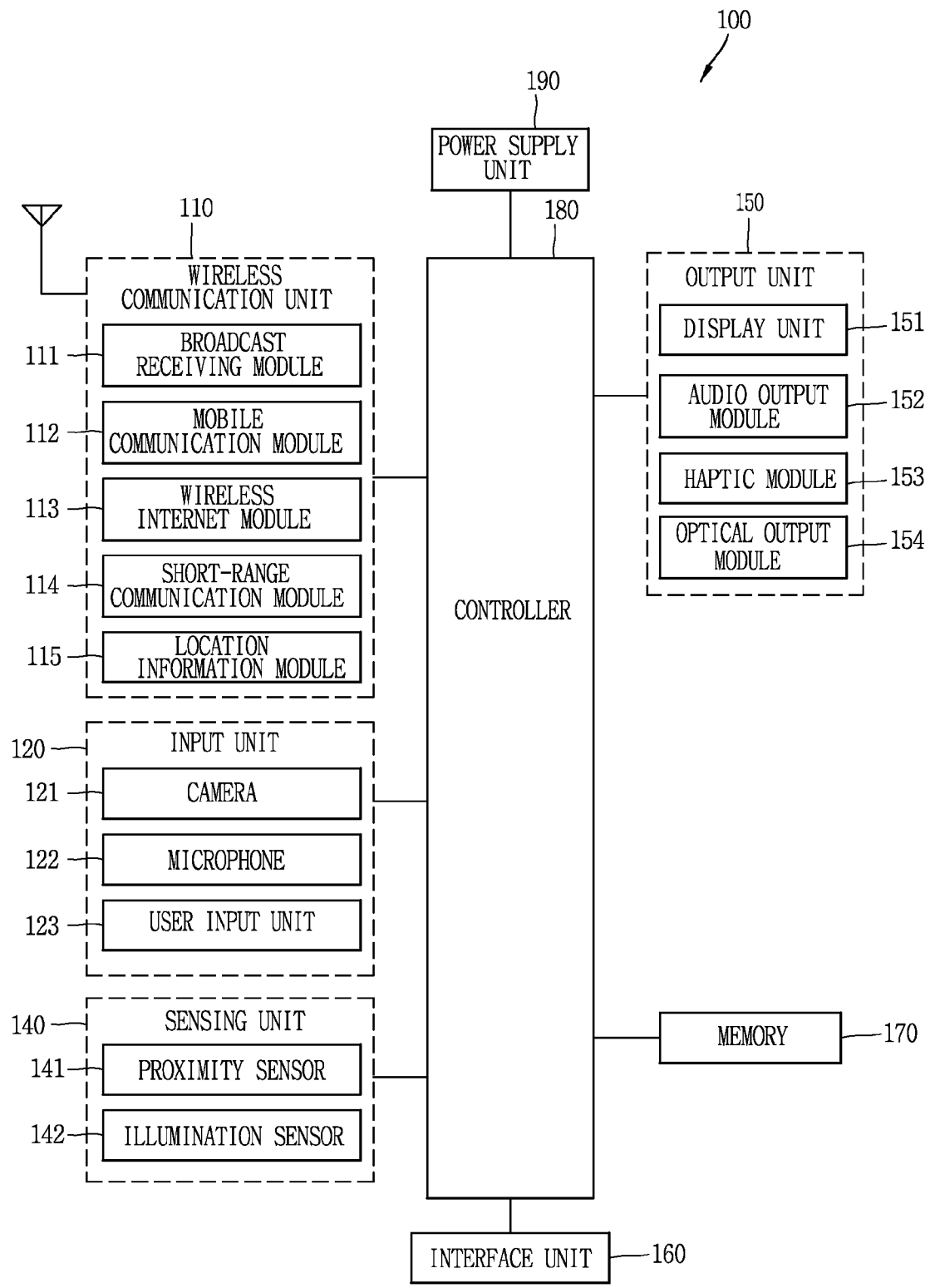
FIG. 1A is a block diagram illustrating a schematic configuration for explaining a mobile terminal according to an embodiment of the present invention.
Figure 1B:
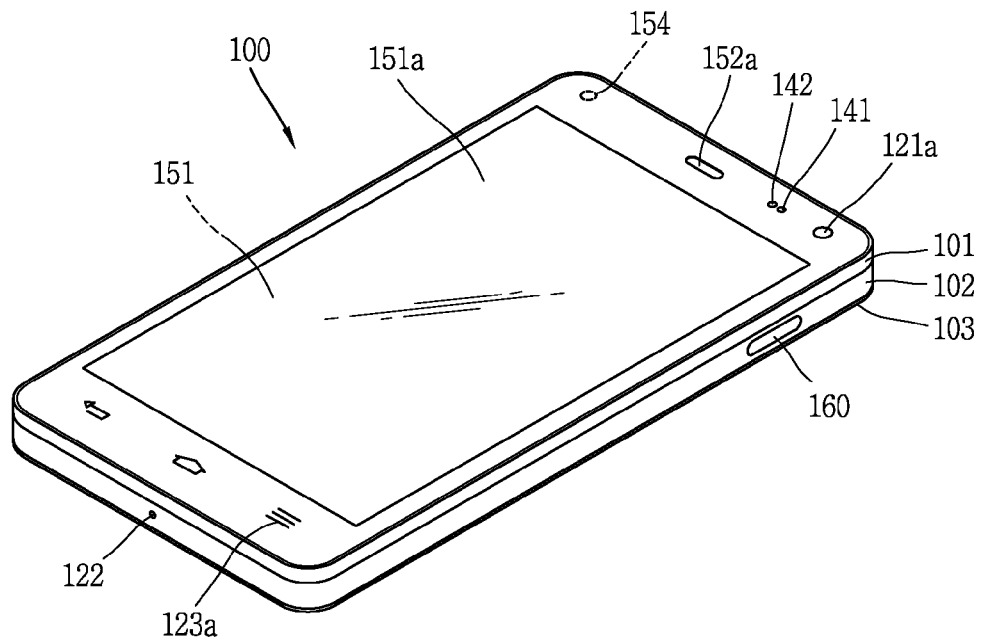
FIGS. 1B and 1C are views illustrating a schematic configuration of a mobile terminal, viewed from different directions according to an embodiment of the present invention.
Figure 1C:
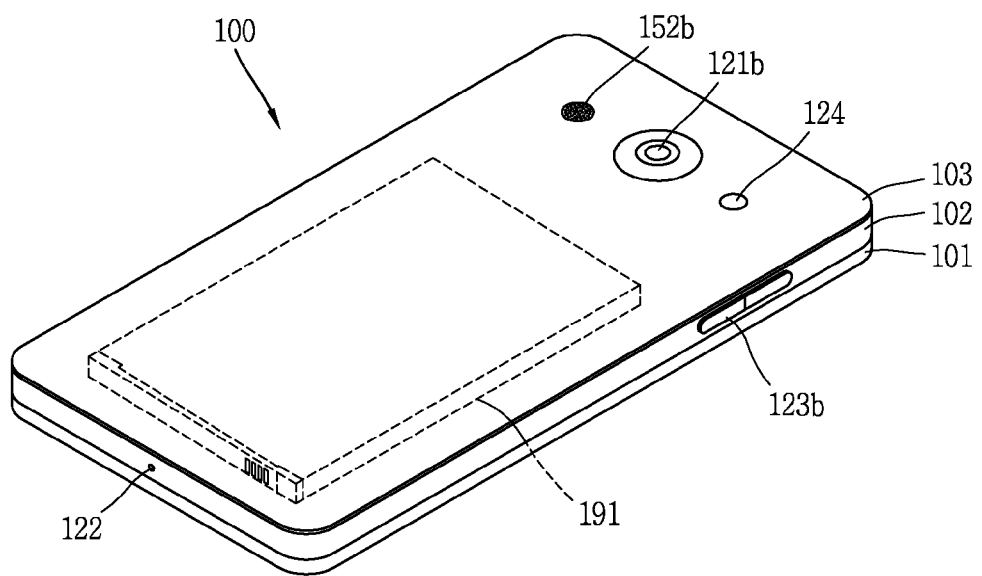

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the body, or configured to be detachable from the body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supplies the appropriate power required for operating respective elements and components included in the mobile terminal 100. The power supply unit 190 may include a battery, which is typically rechargeable or be detachably coupled to the body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the body to output information. As illustrated, a window 151a of the display unit 151 may be mounted to the front case 101 to form the front surface of the body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the body, and the second audio output module 152b may be located on the side surface of the body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the body. As one example, the rear input unit may be located on an upper end portion of the rear side of the body such that a user can easily manipulate it using a forefinger when the user grabs the body with one hand. Alternatively, the rear input unit can be positioned at most any location of the rear side of the body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1C, the second audio output module 152b can be located on the body. The second audio output module 152b may implement stereophonic sound functions in conjunction with the first audio output module 152a, and may be also used for implementing a speaker phone mode for call communication.

At least one antenna for wireless communication may be located on the body. The antenna may be installed in the body or formed by the case. For example, an antenna which configures a part of the broadcast receiving module 111 may be retractable into the body. Alternatively, an antenna may be formed using a film attached to an inner surface of the rear cover 103, or a case that includes a conductive material.

A power supply unit 190 for supplying power to the mobile terminal 100 may include a battery 191, which is mounted in the body or detachably coupled to an outside of the body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In explaining the following descriptions with respect to the attached drawings, in a case where at least two images are illustrated in a single drawing, an image illustrated on a left upper side is called "first drawing", and the rest image(s) will be explained clockwise.

Hereinafter, embodiments related to a control method which may be implemented in the mobile terminal, will be described with reference to the accompanying drawings.

The present invention relates to a mobile terminal including an in-cell touch type display unit, and a method for controlling the same.

The present invention may be implemented in a launcher application which is essentially executed and may also be implemented in the controller 180 of the mobile terminal itself, in order to perform the booting and functions of the mobile terminal.

When the present invention is implemented in the launcher application, the launcher application may be either an application which is set as a basic application in the manufacturing process in the factory or an application which is set to the mobile terminal by a user's selection.

When the application is set to the mobile terminal by a user's selection, a user may download the application via a wireless communication unit. In this instance, a user may use a website where the application may be downloaded. Such a website may be called an application market.

Meanwhile, when the launcher application is operated by being set to the mobile terminal by a user's selection, a launcher application which is originally set to the mobile terminal may not be executed any more to avoid conflict between the two applications.

Further, when a plurality of launcher applications are installed, a user may determine as to whether which one of the plurality of launcher applications is executed.

Hereinbelow, though the description will be described as for a case that the controller 180 of the mobile terminal is executed, the present invention may be implemented in the same manner by use of the launcher application.

Figure 2A:
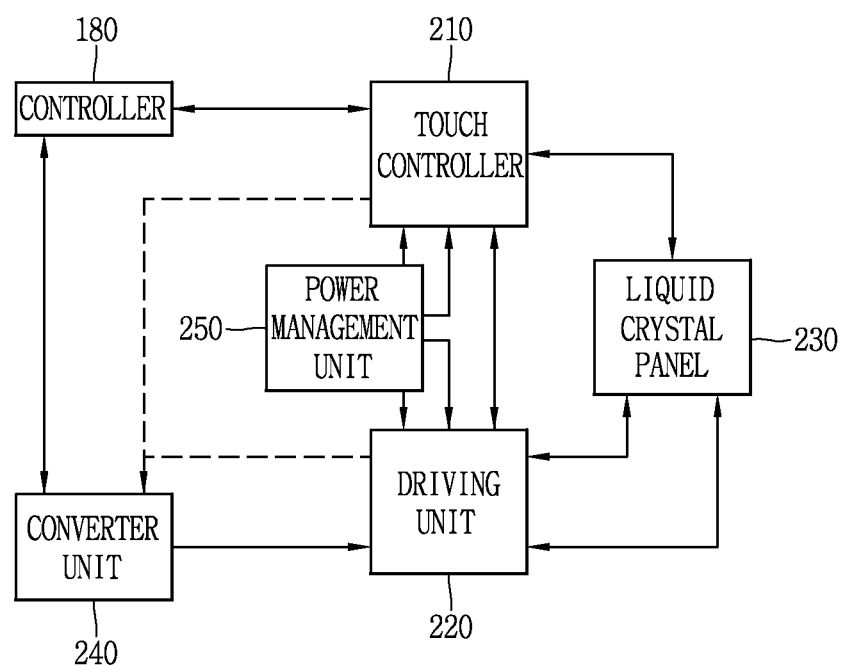
FIG. 2A is a block diagram illustrating a mobile terminal which is operated to detect a touch input using a touch controller, a driving unit and a liquid crystal panel formed in an in-cell touch type according to an embodiment of the present invention.
Figure 2B:
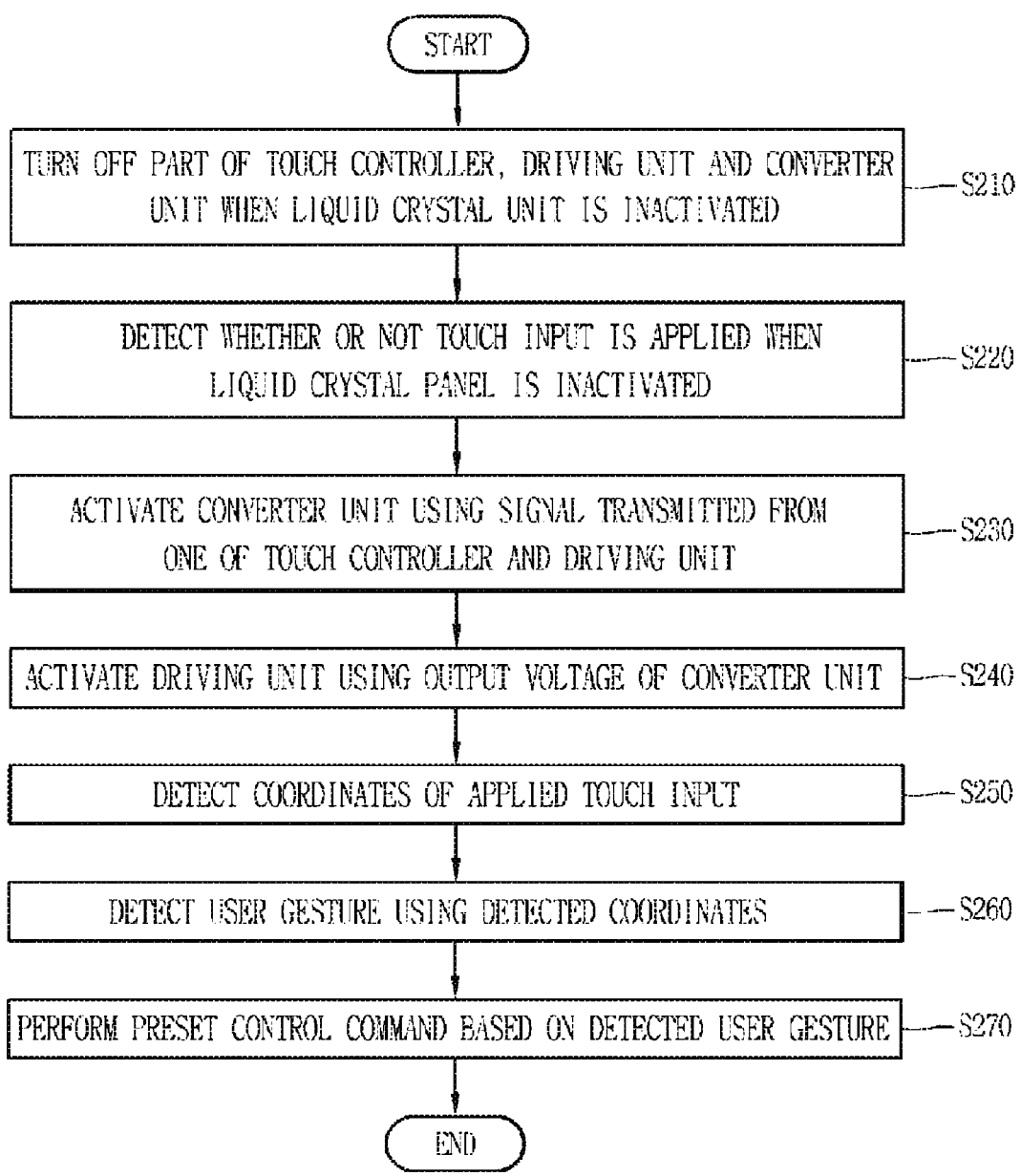
FIG. 2B is a flow-chart illustrating a control method of the terminal illustrated in FIG. 2A.

FIG. 2A is a block diagram illustrating a mobile terminal which is operated to detect a touch input applied to the display unit which is in an inactive state, using a touch controller, a driving unit and a liquid crystal panel formed in an in-cell touch type, according to an embodiment of the present invention, and FIG. 2B is a flow-chart illustrating a control method of the terminal illustrated in FIG. 2A Referring to FIG. 2A, the in-cell touch type display unit 151 may include at least one of a touch controller 210, a driving unit 220 or a liquid crystal panel 230.

The touch controller 210 included in the display unit 151 may detect a user gesture based on a touch input applied to the liquid crystal panel 230. Thus, the touch controller 210 may detect whether a touch input is applied or not. Moreover, the touch controller 210 may detect coordinate information of the touch input.

Further, the touch controller 210 may control activation of the converter unit 240. For instance, the controller 210 may transmit a predetermined signal to the converter unit 240 in a state that the converter unit 240 is turned off, thereby converting the converter unit 240 into an active state. The converter unit 240 may include at least one of a LPF (Low Pass Filter), an A/D converter, a signal processing unit or a coordinates extracting unit.

The low pass filter (LPF) may remove a high frequency component included in a sensing result which is transmitted from a sensing wiring corresponding to a touch block of the liquid crystal panel of the display unit 151, and extract a touch component and then output the touch component. The A/D converter may convert an analog signal output from the low pass filter (LPF) into a digital signal. The signal processing unit may detect whether a touch is applied to the touch block in response to an output signal of the A/D converter. The coordinates extracting unit may detect coordinates at the time that touch detection is performed by the signal processing unit.

In one embodiment, the signal processing unit and the coordinates extraction unit may be an MCU (Micro Controller Unit). Further, the touch controller 210 may be a touch IC (Integrated Circuit). Further, the driving unit 220 may control the operation of the liquid crystal panel 230.

Moreover, the driving unit 220 may control the operation of a transistor which displays RGB (Red, Green and Blue) at each pixel of the liquid crystal panel 230. Further, the driving unit 220 may include a gate IC which has an On/Off function and controls an RGB gate and a source IC which generates a color difference by controlling an image signal of sub pixels (RGB).

For instance, the driving unit 220 may be a display driver IC (Display Driver IC, DDI). The DDI may be classified into a panel DDI and a mobile DDI according to the size and usage.

In addition, the driving unit 220 may receive a voltage from the converter unit 240. That is, the converter unit 240 may generate an output voltage by boosting the input voltage and then apply the output voltage to the driving unit 220.

In particular, the converter unit 240 may boost an input voltage and generate a predetermined output voltage. For instance, the predetermined output voltage may be 5 V.

Further, the converter unit 240 may convert an operation mode of the driving unit 220 by controlling a size of the voltage applied to the driving unit 220. For example, the converter unit 240 may apply the preset output voltage to the driving unit 220 at a predetermined interval and operate the driving unit 220 in a first mode. That is, the converter unit 240 applies the preset output voltage in the form of a square wave to the driving unit 220 and operates the driving unit 220 in the first mode.

When the driving unit 220 is operated in the first mode, a touch AFE (Touch Analog Front End, Touch AFE) may detect whether or not a touch input is applied to the display unit 151. For instance, the converter unit 240 may apply an output voltage which is formed in the shape of square wave with a maximum value of +4V and a minimum value of −4V to the driving unit 220.

Further, the converter unit 240 may operate the driving unit 220 in a second mode by continuously applying a preset output voltage to the driving unit 220. When the driving unit 220 is operated in the second mode, it may control the operation of the liquid crystal panel 230. For instance, the preset output voltage may be +5V or −5V.

Further, the controller 180 may receive an interrupt signal associated with the detected gesture from the touch controller 210. The controller 180 may be converted into an active state when it receives the interrupt signal from the touch controller 210 in an inactive state.

In addition, the controller 180 may perform a preset control command based on the received interrupt signal. For instance, the controller 180 may activate the display unit 151 when a plurality of touches are inputted to a region of the display unit 151 for a predetermined time in a state that the liquid crystal panel is inactivated.

The controller 180 may also perform an activation control of the touch controller 210, the driving unit 220 and the converter unit 240. In addition, the controller 180 may perform a reset control of the touch controller 210, the driving unit 220 and the converter unit 240. In an embodiment, part of the touch controller 210, the driving unit 220 and the converter unit 240 may be turned off in a state that the liquid crystal panel 230 is inactivated.

In one embodiment, when the liquid crystal panel 230 is inactivated, the driving unit 220 and the converter unit 240 may be turned off. In another embodiment, when the liquid crystal panel 230 is inactivated, the touch controller 210 may be turned off.

Further, one of the touch controller 210 and the driving unit 220 may detect whether or not a touch input is applied to the display unit 151 in a state that the liquid crystal panel 230 is in an inactive state. For example, the touch AFE included in the driving unit 220 may detect whether or not a touch input is applied to the display unit 151.

In addition, one of the touch controller 210 and the driving unit 220 may perform a conversion control of an active state of the converter unit 240 in order to detect the touch input. That is, when the touch controller 210 detects whether or not the touch input is applied to the display unit 151 in a state that the liquid crystal panel 230 is turned off, the touch controller 210 may activate the converter unit 240 in response thereto. In this instance, the driving unit 220 may maintain an inactive state in a state that the liquid crystal panel 230 is turned off.

Further, when the touch AFE included in the driving unit 220 detects whether or not a touch is applied, the driving unit 220 may activate the converter unit 240. In this instance, the touch controller 210 may maintain an inactive state when the liquid crystal panel 230 is in an off-state.

FIG. 2B is a block diagram illustrating a method for controlling the display unit, the converter unit and the controller of the mobile terminal according to an embodiment of the present invention.

Referring to FIG. 2B, the controller 180 may turn off part of the touch controller 210, the driving unit 220 and the converter unit 240 in a state that the liquid crystal panel 230 is inactivated (S210). For instance, the controller 180 may turn off the driving unit 220 and the converter unit 240 in a state that the liquid crystal panel 230 is inactivated.

In another embodiment, the controller 180 may turn off the touch controller 210 in a state that the liquid crystal panel 230 is inactivated. In this instance, the controller 180 may set an output voltage of the converter unit 240 while the touch controller 210 is in a turned-off state.

Further, when the liquid crystal panel 230 is inactivated, the controller 180 may be turned off. That is, the controller 180 may be turned-off after performing a predetermined control command to the touch controller 210, the driving unit 220 and the converter unit 240 when the liquid crystal panel 230 is inactivated.

Furthermore, the controller 180 may be operated in a sleep mode when the liquid crystal panel 230 is inactivated. The controller 180 which is operated in a sleep mode may perform part of the plurality of control commands which may be performed by the inactivated controller 180.

Next, one of the touch controller 210 and the driving unit 220 may detect whether or not a touch input is applied to the display unit 151 in a state that the liquid crystal panel 230 is inactivated (S220). For instance, when the driving unit 220 and the converter unit 240 are turned off, the touch controller 210 may detect whether or not the touch input is applied in a state that the liquid crystal panel 230 is inactivated.

In another embodiment, when the touch controller 210 is turned off, the driving unit 220 may detect whether or not the touch input is applied in a state that the liquid crystal panel 230 is inactivated. Next, one of the touch controller 210 and the driving unit 220 may generate a specific signal for enabling the converter unit 240 to be activated, and transmit the signal to the converter unit 240. In addition, the converter unit 240 may be activated by the signal which has been transmitted (S230).

For instance, when the touch controller 210 detects whether or not the touch input is applied, the touch controller 210 generates a signal for activating the converter unit 240, and transmits the signal to the converter unit 240. That is, the touch controller 210 does not activate the controller 180 which has been turned off, but may transmit the signal directly to the converter unit 240 to activate the converter unit 240.

In another embodiment, when the driving unit 220 detects whether or not the touch input is applied, the driving unit 220 generates a signal for activating the converter unit 240, and transmits the signal to the converter unit 240. That is, the driving unit 220 does not activate the controller 180 which has been turned off, but may transmit the signal directly to the converter unit 240 to activate the converter unit 240.

Next, the converter unit 240 may boost an input voltage to generate an output voltage. Further, the converter unit 240 may apply the output voltage to the driving unit 220 to activate the driving unit 220 (S240). That is, the converter unit 240 may apply an output voltage of 5V to the driving unit 220 to activate the driving unit 220 in a state that the driving unit 220 is turned off.

Further, when the touch controller 210 is turned off and the driving unit 220 is operated in a sleep mode which can detect whether or not a touch input is applied, the converter unit 240 changes an output voltage to convert the driving unit 220 from the sleep mode into the active state.

Next, the touch controller 210 may detect coordinate information of the touch input which has been applied (S250). That is, when the touch controller 210 detects whether or not a touch input is applied, the touch controller 210 may detect coordinate information of the touch input using a pulse voltage which has been generated at the activated driving unit 220.

Furthermore, when the driving unit 220 detects whether or not a touch input is applied, the activated driving unit 220 may transmit a predetermined interrupt signal to the touch controller 210 which is in an off-state to activate the touch controller 210. In this instance, the predetermined interrupt signal may include information associated with the touch input.

In addition, the activated touch controller 210 may detect coordinate information of the touch input using the interrupt signal. Further, the touch controller 210 may detect a user gesture based on the detected coordinate information (S260). That is, the touch controller 210 may detect a user gesture using at least one of the coordinate information of the touch input, information associated with a touch time or information associated with a contact time.

For instance, when it is determined that touch inputs are applied to one region of the display unit twice within a predetermined time using coordinate information and touch point of time of the touch inputs, the touch controller 210 may detect a first user gesture. In this instance, the first user gesture may be a double tap.

Next, the controller 180 may perform a predetermined control command based on the detected user gesture (S270). For example, the touch controller 210 may transmit the interrupt signal associated with the detected user gesture to the controller 180, and the controller 180 may receive the interrupt signal.

Further, the controller 180 may perform a predetermined control command based on the received interrupt signal. For instance, when the touch controller 210 detects a first user gesture and transmits the interrupt signal associated with the detected first user gesture, the controller 180 may perform a predetermined control command to apply power to the liquid crystal panel 230 based on the interrupt signal associated with the detected first user gesture.

For information, hereinbelow an inactive state of the liquid crystal panel is defined as a lighting off-state of the display unit or an inactive state of the display unit. In addition, an active state of the liquid crystal panel may be defined as a lighting on-state of the display unit or an active state of the display unit.

FIGS. 3A(a) and 3A(b) are block diagrams illustrating a method to detect a touch input in a state that the driving unit, the converter unit and the controller are turned off according to an embodiment of the present invention.

Referring to FIG. 3A(a), in the mobile terminal including a display unit having a touch sensor, a touch controller 210 and a driving unit 220, the driving unit 220 which is maintained in an active state when the lighting of the display unit is turned on may be converted into an inactive state when the lighting of the display unit 151 is turned off. That is, the driving unit 220 may be converted into an inactive state when the lighting of the display unit 151 is turned off, while maintaining an active state in a state that the lighting of the display unit 151 is turned on.

The driving unit 220 which maintains an active state may supply power to operate the display unit 151. That is, the driving unit 220 which maintains an active state may supply power to operate the display unit to perform an on or off control of the lighting of the display unit. Further, the driving unit 220 which maintains an active state may apply a predetermined pulse voltage via a touch sensor. In addition, the driving unit 220 may receive an image data which will be output from the controller 180 to the display unit 151 and control the display unit 151 to output an image corresponding to the received image data by applying a predetermined voltage.

When the lighting of the display unit 151 is turned off, the driving unit 220 may be converted into an inactive state. That is, the controller 180 may turn off the lighting of the display unit 151 using a predetermined user input, and thereafter convert the driving unit 220 into an inactive state. When the driving unit 220 is converted into an inactive state, the controller 180 may enter a sleep mode. In this instance, the "sleep mode" may be a mode in which power consumption by the controller 180 is minimized.

For instance, in the mobile terminal including a display unit, the display unit may include a liquid crystal panel 230 having a touch sensor, a touch controller 210 which is configured to detect a touch input applied to the display unit 151 in a state that the lighting of the display unit 151 is turned off, and a driving unit 220 which is configured to supply power to the display unit 151. In addition, the mobile terminal may include a converter unit 240 which is configured to supply an output voltage to the driving unit 220.

In this instance, when the liquid crystal panel 230 is in an inactive state in a state that the lighting of the display unit 151 is turned off, the driving unit 220 and the converter unit 240 may be inactivated, and the controller 180 may be operated in a sleep mode or turned off.

That is, when the liquid crystal panel 230 is converted from an active state into an inactive state, the controller 180 may convert the driving unit 220 and the converter unit 240 into an inactive state. Further, the controller 180 may change a power applied to the driving unit 220 by controlling operation of a power management unit 250 included in the display unit 151.

For instance, the controller 180 may inactivate the converter unit 240 to set an output voltage of the converter unit 240 to 0V in order to inactivate the driving unit 220. That is, the controller 180 may inactivate the driving unit 220 by setting the output voltage applied to the driving unit 220 to 0V. In another embodiment, the controller 180 may maintain or release a power applied from the power management unit 250 in a state that the driving unit 220 is inactivated.

As described hereinbefore, the touch controller 210 may detect a touch input applied to the display unit 151 of which the lighting is turned off in a state that the lighting of the display unit 151 is turned off and the driving unit is inactivated. For example, the touch sensor may include a first sensor and a second sensor, and the touch controller 210 may detect a touch input applied to the display unit 151 of which the lighting is turned off, using one of the first and second sensors. That is, when the driving unit 220 is inactivated, a pulse voltage may be applied to one of the first and second sensors.

In addition, when the driving unit 220 is converted from an inactive state into an active state, a pulse voltage may be applied to both the first and second sensors. In this instance, a pulse voltage of the first sensor may be applied by the touch controller 210. Further, in this instance, a pulse voltage of the second sensor may be applied by the driving unit 220 which is converted into an active state based on sensing of the touch input using the first sensor.

For instance, the touch controller 210 may apply a first pulse voltage to the first sensor at a predetermined period in a state that the lighting of the display unit 151 is turned off and the driving unit 220 is inactivated. Thus, the touch controller 210 may receive first information associated with a touch input from the first sensor in response to application of the first pulse voltage. Further, the touch controller 210 may detect the touch input using the received first information.

For instance, the touch controller 210 may determine whether or not a touch input is generated, using a voltage difference between a pulse received by the first sensor before generation of the touch input and a pulse received by the first sensor immediately after generation of the touch input. In this instance, the touch controller 210 may acquire information associated with one of the 2-dimensional coordinate information of the touch input. For instance, when the first sensor is vertically disposed and the second sensor is horizontally disposed, the touch controller 210 may detect information associated with a horizontal component of the touch input. In an opposite case, the touch controller 210 may detect information associated with a vertical component of the touch input. Thus, the touch controller 210 may detect whether or not a touch input is applied to the display unit 151 of which the lighting is turned off, using coordinate information associated with the acquired touch input.

Further, the touch controller 210 may convert the driving unit 220 into an active state when the touch input is detected. Specifically, when the touch input is detected in a state that the display unit 151 is turned off, the touch controller 210 may convert part of the driving unit 220 which is connected to the touch sensor into an active state.

The touch controller 210 may activate the converter unit 240 in order to convert the driving unit 220 into an active state. Thus, the activated converter unit 240 may activate the driving unit 220 by applying an output voltage with a predetermined value to the driving unit 220.

For instance, the activated converter unit 240 may boost an input voltage to an output voltage of 5V and apply the output voltage of 5V to the driving unit 220. Thus, the converter unit 240 may convert the driving unit 220 which is inactive state into an active state.

As shown in FIG. 3A(a), when it is determined that a touch input is applied, the touch controller 210 may activate the converter unit 240 using an input/output port 301 connecting the touch controller 210 and the converter unit 240. For instance, the input/output port 301 may transmit a logic signal for activating or turning off the converter unit 240.

Further, the touch controller 210 may detect touch coordinates of the touch input using the first and second sensors together in response to conversion of the driving unit 220. The activated driving unit 220 may apply the second pulse to the second sensor. In this instance, the touch controller 210 may receive second information associated with the touch input from the first sensor in response to application of the second pulse.

For instance, the first sensor may be a sensor receiver (Rx) and the second sensor may be a sensor transmitter (Tx). In another embodiment, the second sensor may be connected to the driving unit 220. The first and second sensors are described in more detail with reference to FIGS. 3B(a) and 3B(b).

Referring to FIG. 3A(b), the driving unit 220 may include a predetermined memory 221. According to an embodiment, the predetermined memory 221 may be installed separately from the memory 170 of the mobile terminal. For instance, the predetermined memory 221 may be an OTP memory (One Time Programmable Memory, OTP Memory).

In this instance, the memory 221 may store setting information associated with an initialization operation of the driving unit 220. For instance, the setting information associated with an initialization operation may include a preset code for performing an initialization operation.

Thus, when the driving unit 220 is converted into an active state by the touch controller 210, the driving unit 220 may perform an initialization operation using the pre-stored setting information. That is, when the driving unit 220 is activated by an output voltage applied from the converter unit 240, the driving unit 220 may perform an initialization operation thereof using an initialization code stored in the memory 221. As a result, since the driving unit 220 can perform its initialization operation using an initialization code stored in the memory 221, it is not necessary to activate a module such as the controller 180 in the course of activating the driving unit 220.

Next, FIGS. 3B(a) and 3B(b) are diagrams illustrating features of the driving unit and liquid crystal unit illustrated in FIGS. 3A(a) and 3A(b). Referring to FIG. 3B(a), the display unit 151 may include a touch sensor having a first sensor 231 and a second sensor 232. For example, the liquid crystal panel 230 of the display unit 151 may include a touch sensor having a sensor receiver (Rx) 231 and a sensor transmitter (Tx) 232. Further, the liquid crystal panel 230 may include a filter (C/F) 233 and a transistor (TFT) 234.

Further, as shown in FIG. 3B(b), the sensor receiver 231 and the sensor transmitter 232 may be disposed to be crossed at right angles. In this instance, the touch controller 210 may detect whether or not a touch input is applied, using first information sensed at the sensor receiver 231. In other words, the touch controller 210 may detect whether or not a touch input is applied using first information which is sensed from the sensor receiver 231 in a state that the driving unit 220 is turned off (inactivated).

That is, the touch controller 210 can sense first information associated with application of the user touch input by use of the first pulse voltage applied from the touch controller 210 to the first sensor, though the second pulse voltage is not applied to the second sensor from the driving unit 220. For instance, the sensor receiver 231 may sense whether or not a touch input is applied or two-dimensional coordinate information of the touch input in a case where a user touch input is applied to the display unit 151 of which the lighting is turned off. Thus, the first information may be related to one of the two-dimensional coordinate information.

Further, the touch controller 210 may detect coordinate information of the touch input, using the second information sensed by the sensor transmitter 232 and the first information. Moreover, when the driving unit 220 is activated after the touch input is applied, the driving unit 220 may apply the second pulse voltage to the second sensor 232, using an output voltage applied from the converter unit 240.

In this instance, the touch controller 210 can detect touch coordinates of the touch input, using the applied second pulse voltage. Therefore, the touch controller 210 can receive second information from the first sensor 231 which is associated with the touch input, in response to application of the second pulse voltage by the activated driving unit 220.

For instance, the second information may include one which is different from that included in the first information among the two-dimensional coordinate information of the touch input. Accordingly, the touch controller 210 can detect the touch coordinates of the touch input, using the first and second information.

In addition, the display unit 151 may be converted into an on-state based on the preset user gesture including at least one touch input which is applied in a state that the lighting is turned off. Further, the touch controller 210 may determine whether the preset user gesture is applied, using the coordinate information of the touch input and the coordinate information of at least one touch input which is applied in a state that the display unit 151 is turned off.

For instance, the touch input and at least one touch input may be a tap which is applied to the display unit 151. Further, the preset user gesture may be specified based on at least one of a region of the display unit 151 where the tap is applied, a time interval between the plurality of taps or a number of the plurality of taps.

The controller 180 may control the mobile terminal in combination with at least one of the display unit 151, the touch controller 210 or the driving unit 220. The controller 180 may be operated in a sleep mode in a state that the lighting of the display unit 151 is turned off. Further, the controller 180 may be converted into an active mode based on input of the preset user gesture. In addition, the controller 180 which has been converted into an active mode may turn on the lighting of the display unit 151.

In addition, the preset user gesture may include a plurality of user gestures which are specified by a position where the touch input and the at least one touch input are applied. In this instance, the controller 180 may execute a first application when a first user gesture is applied among the plurality of user gestures. Further, the controller 180 may execute a second application which is different from the first application when a second user gesture is applied among the plurality of user gestures.

As described hereinabove, an embodiment in which the user gesture is specified by a position will be described in more detail with reference to FIGS. 11(a)-12(c).

Meanwhile, referring to FIG. 2A, the power management unit 250 may apply a power independently to the touch controller 210 and the driving unit 220. In this instance, the touch controller 210 and the driving unit 220 may operate at least one of an analog block or a digital block which are included in each of the touch controller 210 and the driving unit 220, using the power supplied from the power management unit 250.

FIG. 4 is a flow-chart illustrating a control method of the terminal illustrated in FIGS. 3A(a) and 3A(b).

In the mobile terminal including the display unit having first and second touch sensors, a touch controller and a driving unit according to an embodiment of the present invention, the controller 180 may convert the driving unit 220, which is maintained in an active state when the lighting of the display unit 151 is turned on, into an inactive state when the lighting of the display unit 151 is turned off (S401). In this instance, the controller 180 controls the touch controller 210 to be maintained in an active state and the converter unit 240 to be converted into an inactive state. The controller 180 may be operated in a sleep mode in response to conversion of the driving unit 220 into an inactive state.

Next, the touch controller 210 may detect a touch input applied to the display unit 151 of which the lighting is turned off, using one of the first and second touch sensors (S402). Further, the touch controller 210 may convert the driving unit 220 into an active state in response to application of the touch input (S403).

The touch controller 210 may detect a coordinates of the touch input using both the first and second touch sensors, based on conversion of the driving unit 220 into an active state (S404). The touch controller 210 may determine whether or not the preset user gesture is applied using the coordinate information of the touch input and the coordinate information of at least one another touch input applied when the display unit is turned off (S405).

In addition, the touch controller 210 may convert the lighting of the display unit 151 into a turn-on state based on the predetermined user gesture (S406). Specifically, the touch controller 210 may convert the controller 180 which is in a sleep mode into an active mode based on the predetermined user gesture. Further, the controller 180 which has been converted into an active mode may convert the lighting of the display unit 151 into a turn-on state. For instance, the predetermined user gesture may be a double tap which is applied to one region of the display unit 151 within a predetermined time.

Hereinbelow, a control method for a mobile terminal according to an embodiment of the present invention will be described. When the liquid crystal panel 230 of the display unit 151 is inactivated, the controller 180 may turn off the converter unit 240 and the driving unit 220 of the display unit 151. Further, the controller 180 may be turned off after the converter unit 240 and the driving unit 220 of the display unit 151 are turned off.

Next, the touch controller 210 may detect whether or not a touch input is applied to the liquid crystal panel 230 which is inactivated. Further, the touch controller 210 may generate and transmit a signal for activating the converter unit 240. That is, the touch controller 210 may activate the converter unit 240 not by activating the controller 180 which is turned off, but by directly transmitting the signal to the converter unit 240.

Next, the converter unit 240 may generate an output voltage by boosting an input voltage. Further, the converter unit 240 may activate the driving unit 220 by applying the output voltage to the driving unit 220. That is, the converter unit 240 may activate the driving unit 220 by applying an output voltage of 5V thereto in a state that the driving unit 220 is turned off.

Next, the touch controller 210 may detect coordinate information of the applied touch input. That is, when the touch input is detected by the touch controller 210, the touch controller 210 may detect coordinate information of the touch input, using a pulse voltage which is generated by the activated driving unit 220.

Further, the touch controller 210 may detect a user gesture based on the detected coordinate information of the touch input. In particular, the touch controller 210 may detect a user gesture using at least one of the coordinate information of at least one touch input, information associated with a touch time point, or information associated with a contact time point.

For instance, when it is determined that two touch inputs are applied to one region of the display unit 151 for a predetermined time, the touch controller 210 may detect a first user gesture using coordinate information of two touch inputs and information associated with a touch time point. In this instance, the first user gesture may be a double tap.

Next, the controller 180 may perform a preset control command based on the detected user gesture. For example, the touch controller 210 may transmit an interrupt signal associated with the detected user gesture to the controller 180, and the controller 180 may receive the interrupt signal.

Further, the controller 180 may perform a preset control command based on the received interrupt signal. For instance, when the touch controller 210 detects the first user gesture and transmits an interrupt signal associated with the detected first user gesture, the controller 180 may perform a preset control command to supply a power to the liquid crystal panel, based on the interrupt signal associated with the first user gesture.

Figure 5A:
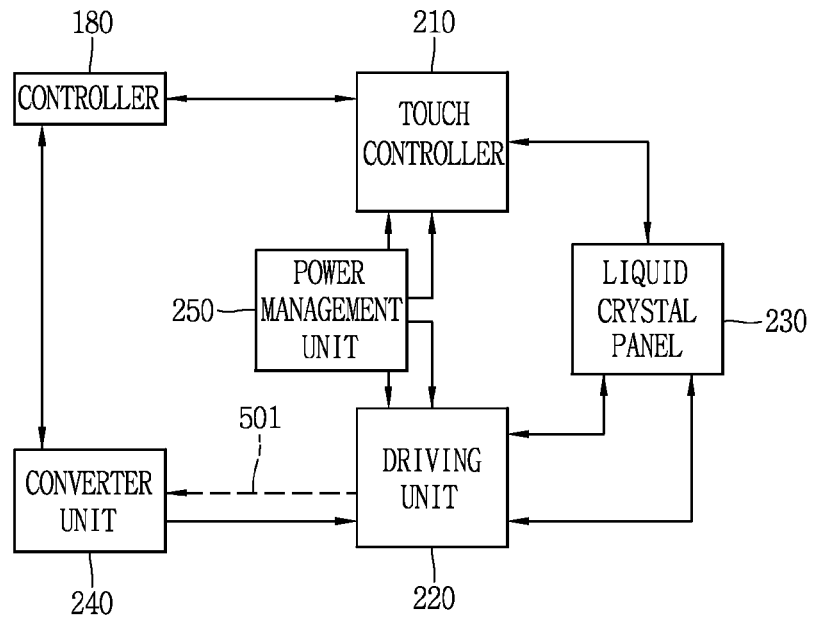
FIGS. 5A(a), 5A(b), and 5A(c) are block diagrams illustrating a method to detect a touch input in a state that the touch controller and the controller are turned off according to an embodiment of the present invention.
Figure 5A:
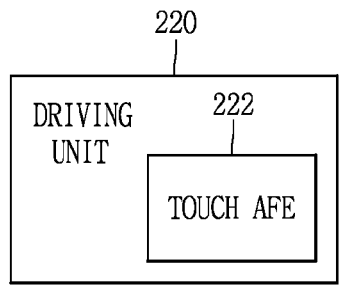
Figure 5A:
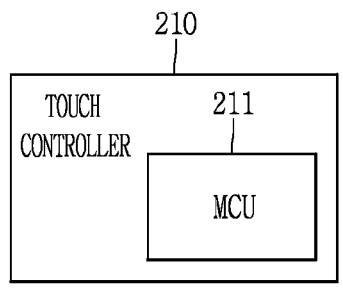

FIGS. 5A(a), 5A(b), and 5A(c) are block diagrams illustrating a method to detect a touch input in a state that the touch controller and controller are turned off according to an embodiment of the present invention.

Referring to FIG. 5A(a), in the mobile terminal including a touch sensor, a touch controller 210 and a driving unit 220, the touch controller 210 which is maintained in an active state in a state that the lighting of the display unit 151 is turned on, may be converted into an inactive state when the lighting of the display unit 151 is turned off. That is, the touch controller 210 may be converted into an inactive state when the lighting is turned off, while maintaining an active state when the lighting of the display unit 151 is turned on.

That is, the touch controller 210 which maintains an active state may detect a touch coordinates of at least one touch input applied to the display unit 151 of which the lighting is turned off. Further, the touch controller 210 may determine whether or not a preset user gesture including at least one touch input is applied in a state that the lighting of the display unit 151 is turned off, using the detected touch coordinates.

When the lighting of the display unit 151 is converted into a turn-off state, the touch controller 210 may be converted into an inactive state. That is, the controller 180 may turn off the lighting of the display unit 151 using a predetermined user input, and thereafter convert the touch controller 210 into an inactive state. When the touch controller 210 is converted into an inactive state, the controller 180 may enter a sleep mode.

For instance, in a mobile terminal including a display unit 151 with a liquid crystal panel 230 having a touch controller 210, a driving unit 220 and a touch sensor, and a converter unit 240, the touch controller 210 may be inactivated in a state that the lighting of the display unit 151 is turned off and the liquid crystal panel 230 is inactivated. That is, when the liquid crystal panel 230 is converted from an active state to an inactive state, the controller 180 may inactivate the touch controller 210. Further, the controller 180 may change a power applied to the touch controller 210 by controlling an operation of the power management unit 250 included in the display unit 151.

The driving unit 220 may operate in a first mode in a state that the lighting of the display unit 151 is turned off and the liquid crystal panel 230 is inactivated. In this instance, the controller 180 which is operated in a first mode in order to detect a touch input applied to the display unit 151 of which the lighting is turned off may apply a predetermined pulse to the touch sensor.

For instance, the controller 180 may control an output voltage of the converter unit 240 to operate the driving unit 220 in a first mode. In this instance, the controller 180 may control the converter unit 240 so that the driving unit 220 may receive an output voltage of half waveform having predetermined amplitude, in order to operate the driving unit 220 in a first mode.

That is, when a user input for turning off the lighting of the display unit 151 is applied, the controller 180 may inactivate the touch controller 210 and control the output voltage of the converter unit 240, thereby operating the driving unit 220 in a first mode. Thereafter, when the lighting of the display unit 151 is turned on, the controller 180 may convert the driving unit 220 into a second mode.

Here, the driving unit 220 which is operated in a second mode may detect a touch input applied to the display unit 151, and control an output image of the display unit 151. That is, the driving unit 220 which is operated in a second mode may control the display unit 151 to receive data associated with an output image of the display unit 151 from the controller 180 and output an output image corresponding to the received data.

Meanwhile, when the driving unit 220 is operated in a second mode, the controller 180 may control the converter unit 240 to maintain the output voltage in a first voltage value for a first time interval at a predetermined period, and gradually decrease the output voltage for a second time interval after the first time interval.

A method for controlling an output voltage of the converter unit when the driving unit 220 is operated in a first mode, as described above, will be described in more detail with reference to FIGS. 7(*a*)-7(*c*).

As described above, the driving unit 220 which is operated in the first mode in a state that the lighting of the display unit 151 is turned off and the touch controller 210 is inactivated, may detect a touch input applied to the display unit 151 of which the lighting is turned off. That is, the driving unit 220 which is operated in the first mode may apply a predetermined pulse voltage to the touch sensor at a predetermined period in a state that the lighting of the display unit 151 is turned off and the touch controller 210 is inactivated.

As a result, the driving unit 220 may receive information associated with the touch input from the touch sensor in response to application of the predetermined pulse voltage. Further, the controller 180 may determine whether or not the touch input is generated by receiving information associated with the touch input.

Furthermore, when the touch input is sensed, the driving unit 220 may activate the touch controller 210. For example, when the touch input is sensed in a state that the display unit 151 is turned off, the driving unit 220 may transmit the preset first signal to the touch controller 210.

The touch controller 210 which is in an inactive state may be converted into an active state using the preset signal. For instance, the preset signal may include an interrupt signal for activating the touch controller 210.

In addition, the driving unit 220 may transmit information associated with the touch input to the touch controller 210 in response to conversion of the touch controller 210 into an active state. Further, the touch controller 210 which has been converted into an active state may detect touch coordinates of the touch input, using information associated with the transmitted touch input.

Referring to FIGS. 5A(*a*), 5A(*b*), and 5A(*c*), turning off of the lighting of the display unit 151 including the touch controller 210, the driving unit 220 and the liquid crystal panel 230 may correspond to activation of the liquid crystal panel 230 of the display unit 151. That is, the controller 180 may inactivate the converter unit 210 when the liquid crystal panel 230 is inactivated. Further, the controller 180 may change a power applied to the touch controller 210 by controlling the operation of the power management unit 250 included in the display unit 151.

When the liquid crystal panel 230 is inactivated, the controller 180 may operate the driving unit 220 in the first mode. Further, when the liquid crystal panel 230 is activated, the controller 180 may operate the driving unit 220 in the second mode.

The driving unit 220 may detect whether or not a touch input is applied in the first mode. Meanwhile, the driving unit 220 may control an output image of the display unit 151 by controlling operation of the liquid crystal panel 230 in the second mode.

Further, when the liquid crystal panel 230 is inactivated, the controller 180 may control an output voltage of the converter unit 240 in a preset type in order to operate the driving unit 220 in the first mode. For instance, the preset type output voltage may have a predetermined period. In one embodiment, the preset type output voltage may have a half waveform. Further, when a touch input is applied to the display unit 151 in a state that the driving unit 220 is operated in the first mode, the driving unit 220 may detect whether or not the touch input is applied.

Referring to FIG. 5A(*b*), the driving unit 220 may include a touch analog front end (Touch Analog Front End, Touch AFE). When a touch input is applied to the liquid crystal panel 230 in a state that the driving unit 220 is operated in the first mode, the touch AFE of the driving unit 220 may detect whether or not the touch input is applied, using a predetermined pulse voltage applied from the driving unit 220 to the touch sensor.

In addition, as shown FIG. 5A(*a*), the driving unit 220 may transmit a signal for controlling an output voltage of the converter unit 240 in a state that the liquid crystal panel 230 is inactivated. The converter unit 240 may be activated or inactivated at a predetermined period, using the input/output port 501 connecting the driving unit 220 and the converter unit 240. For instance, the input/output port 501 may transmit a logic signal for activating or turning off the converter unit 240. Further, the driving unit 220 may detect a touch input applied to the display unit 151 in a state that the driving unit 220 is operated in the first mode and the liquid crystal panel 230 is inactivated.

Referring to FIG. 5A(c), the touch controller 210 may include a microcontroller 211. When the touch controller 210 is activated by receiving the preset signal from the driving unit 220, the microcontroller 211 may detect coordinate information of the touch input applied to the liquid crystal panel 230, using information associated with the touch input received from the driving unit 220. In addition, the touch controller 210 may detect a user gesture, using the detected coordinate information.

Figure 5B:
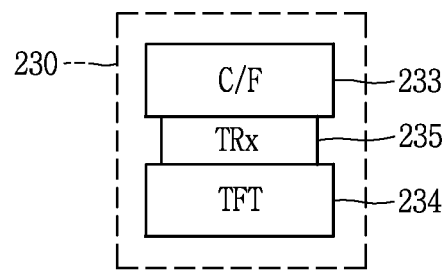
FIGS. 5B(a) and 5B(b) are diagrams illustrating features of the driving unit, the touch controller and the liquid crystal panel illustrated in FIGS. 5A(a), 5A(b), and 5A(c)
Figure 5B:
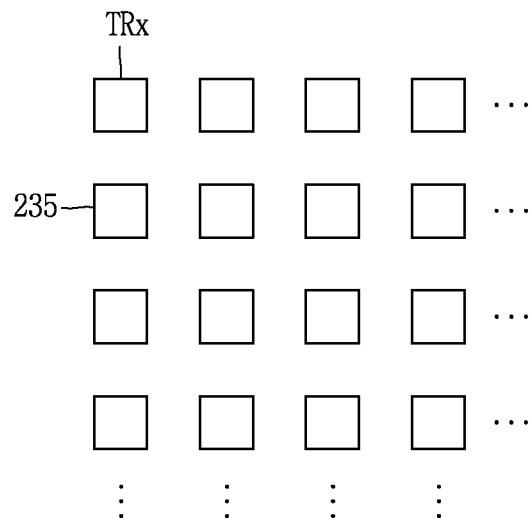

Hereinbelow, the features of the liquid crystal panel illustrated in FIG. 5A(a) will be described with reference to FIGS. 5B(a) and 5B(b). Referring to FIG. 5B(a), the liquid crystal panel 230 may include a touch sensor 235 which is disposed in a lattice form. In this instance, the touch sensor 235 may be a sensor transceiver (TRx). Further, the liquid crystal panel 230 may include the transceiver (TRx), the filter (C/F) 233 and the transistor (TFT) 234.

Further, as shown in FIG. 5B(b), a plurality of sensor transceivers (TRx) 235 may be disposed between the filter 233 and the transistor 234 at a predetermined interval. That is, the plurality of transceivers (TRx) may be disposed in a lattice form.

The driving unit 220 may transmit information associated with the touch input to the touch controller 210, using information sensed by the sensor transceiver (TRx). For instance, the information associated with the touch input may include at least one of coordinate information of the touch input, touch time point information of the touch input or maintaining time information of the touch input.

Hereinbelow, a control method for a mobile terminal including an in-cell type display unit shown in FIGS. 5A(a)-5B(b) will be described with reference to FIG. 6. First, the controller 180 may convert the touch controller 210, which is maintained in an active state when the lighting of the display unit 151 is turned on, into an inactive state when the lighting of the display unit 151 is converted into a turned-off state (S601).

That is, the controller 180 may transmit a signal for turning off the touch controller 210 via a serial bus connected to the touch controller 210. Further, when the lighting of the display unit 151 is turned off, the controller 180 may operate the driving unit 220 in the first mode. In this instance, the driving unit 220 which is operated in the first mode may detect whether or not the touch input is applied to the display unit 151 in a state that the lighting of the display unit 151 is turned off.

Further, the controller 180 may control an output voltage of the converter unit 240 in a preset type in order to operate the driving unit 220 in the first mode. For instance, the controller 180 may control the converter unit 240 to apply a predetermined output voltage to the driving unit 220 at a first time interval. In this instance, the predetermined output voltage may have a voltage value of 0V through 5V.

In another embodiment, the controller 180 may control the converter unit 240 to apply an output voltage of 0V to the driving unit 220 for a second time interval. That is, the controller 180 may control the converter unit 240 not to apply a voltage to the driving unit 220.

In still another embodiment, the controller 180 may control the converter unit 240 to repeatedly perform an operation to boost a predetermined output voltage for a first time interval and not to boost a predetermined output voltage for a second time interval. When the lighting of the display unit 151 is turned off, the controller 180 may be turned off after turning off the touch controller 210.

Next, the driving unit 220 which is operated in the first mode may detect the touch input applied to the display unit 151 of which the lighting is turned off, using the touch sensor (S602). For example, the touch AFE 221 included in the driving unit 220 may detect whether or not the touch input is applied to the display unit 151 in a state that the lighting of the display unit 151 is turned off, using the touch sensor. That is, the driving unit 220 may apply periodically a pulse voltage to the touch sensor, using a voltage applied from the converter unit 240. Thus, when the touch input is applied to the display unit 151 of which the lighting is turned off, the driving unit 220 may detect whether or not the touch input is applied by receiving information associated with the touch input from the touch sensor. For instance, the information associated with the touch input may be related to an electric capacitance change of at least one capacitor disposed at the touch sensor.

Further, the driving unit 220 may convert the touch controller 210 into an active state by the driving unit 220 in response to sensing of the touch input (S603). In addition, the driving unit 220 may transmit information associated with the touch input to the touch controller 210 based on conversion of the touch controller 210 into an active state (S604).

Further, it is possible to detect coordinate information of the touch input, using information associated with the touch input (S605). In addition, the touch controller 210 may detect a user gesture, using at least one of the detected coordinate information or information related to the maintaining time.

Next, the touch controller 210 may transmit an interrupt signal associated with the detected user gesture to the controller 180. The touch controller 210 may activate the controller 180 which is in a turn-off state by transmitting the interrupt signal to the controller 180.

In addition, the controller 180 may perform a preset control command, using the interrupt signal associated with the detected user gesture. For instance, when a touch input is applied to one region of the inactivated liquid crystal panel 230 twice within a predetermined time, the controller 180 may perform a control command for activating the liquid crystal panel 230.

Hereinbelow, a method to boost an output voltage by the converter unit 240 in a preset type in order to operate the driving unit 220 illustrated in FIGS. 5A(a)-5A(c) in a first or second mode, will be described with reference to FIGS. 7(*a*), 7(*b*), and 7(*c*).

Figure 7A:
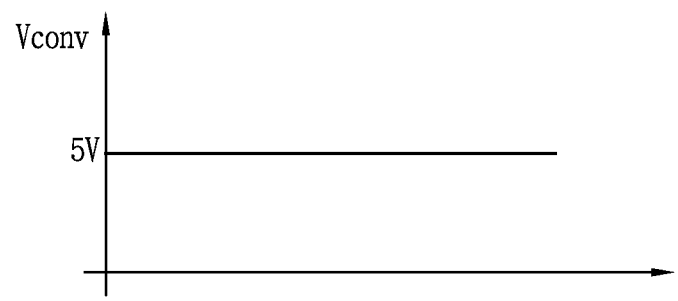
FIGS. 7A, 7B, and 7C are graphs illustrating an output voltage according to an operation mode of the converter unit illustrated in FIGS. 5A(a), 5A(b), and 5A(c)

Referring to FIG. 7A, the converter unit 240 may boost an input voltage to generate an output voltage (Vconv) having a predetermined voltage value. For instance, the predetermined voltage value may include at least one of +5V or −5V.

When the converter unit 240 generates an output voltage (Vconv) having a predetermined voltage value by continuously boosting an input voltage, the driving unit 220 may be operated in the second mode. When the driving unit 220 is operated in the second mode, an operation of the liquid crystal panel 230 may be controlled. That is, the driving unit 220, which is operated in the second mode, may receive data associated with an image from the controller 180, and control a transistor of the liquid crystal panel 230 using the received data to output an output image corresponding to the received data to the display unit 151.

For example, the driving unit 220 which is operated in the second mode may perform a preset control command to at least one of the filter (C/F) 233, the transistor (TFT) 234, the sensor receiver (Rx) 231, the sensor transmitter (Tx) 232 or the sensor transceiver (TRx) included in the liquid crystal panel 230. That is, the driving unit 220 which is operated in the second mode may control an output image of the display unit 151 and detect information associated with the touch input applied to the display unit 151. That is, the driving unit 220 which is operated in the second mode may be completely in an active state.

For instance, the driving unit 220 which is operated in the second mode may apply a pulse to the sensor transceiver (TRx) of the liquid crystal panel 230. The sensor transceiver (TRx) may sense information associated with the user touch input.

Figure 7B:
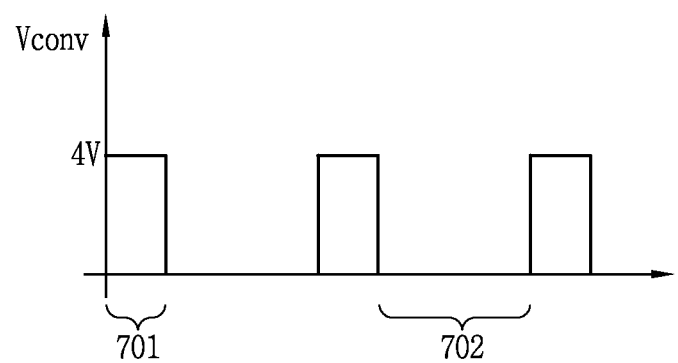

Meanwhile, referring to FIG. 7B, the converter unit 240 may operate the driving unit 220 in the first mode by adjusting a magnitude of the output voltage (Vconv) applied to the driving unit 220. For example, the converter unit 240 may operate the driving unit 220 in the first mode by applying an output voltage (Vconv) of square wave form to the driving unit 220. In this instance, the converter unit 240 may maintain the output voltage to a first voltage value for a first time interval in accordance with a preset period, and thereafter gradually decrease the output voltage for a second time interval. The driving unit 220 may receive an output voltage of the converter unit 240 by controlling the output voltage of the converter unit 240 as described above. In this instance, the driving unit 220 or the converter unit 240 may receive setting information associated with the first and second time intervals and the first and second voltage values of the output voltage from the controller 180.

When the driving unit 220 is operated in the first mode, the touch AFE (Touch Analog Front End, Touch AFE) included in the driving unit 220 may detect whether or not the touch input is applied to the display unit 151. For instance, the converter unit 240 may apply an output voltage (Vconv) having a maximum value of +4V and a minimum value of −4V in the square waveform to the driving unit 220.

Further, the converter unit 240 may apply an output voltage of 4V to the driving unit 220 for a first time interval (701). In addition, the converter unit 240 may apply an output voltage of 0V to the driving unit 220 for a second time interval (702). In this instance, the driving unit 220 may be operated in the first mode.

The driving unit 220 which is operated in the first mode may detect whether or not a touch input is applied to the inactivated liquid crystal display panel 230. That is, the touch AFE 221 included in the driving unit 220 which is operated in the first mode may detect whether or not a touch input is applied to the inactivated liquid crystal display panel 230.

In addition, when it is determined that a predetermined touch input is applied to the inactivated liquid crystal panel 230 in a state that the driving unit 220 is operated in the first mode, the driving unit 220 may change an output voltage of the converter unit 240. That is, when it is determined that a predetermined touch input is applied, the driving unit 200 may apply a signal for activating the converter unit 240 so that the converter unit 240 may continuously generate an output voltage having a predetermined voltage value. According to an embodiment, the driving unit 220 may transmit a signal for activating the converter unit 240, using the input/output port 501 connecting the converter unit 240 and the driving unit 220.

Figure 7C:
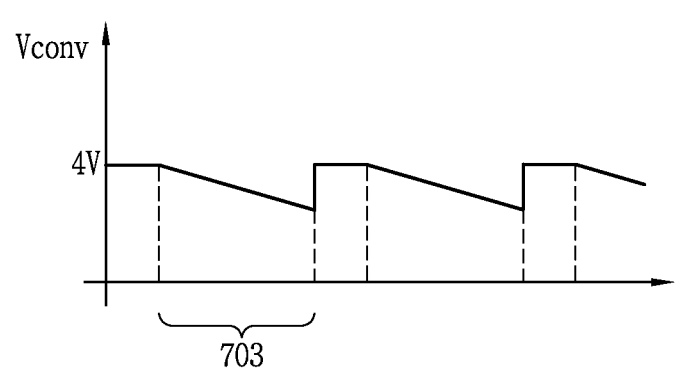

Referring to FIG. 7C, the converter unit 240 may maintain an output voltage having a first voltage value for a first time interval, and thereafter gradually decrease a voltage value of the output voltage for a second time interval. For example, the converter unit 240 may generate an output voltage by boosting an input voltage as much as the first voltage value for the first time interval (701) in accordance with a preset period. Further, the converter unit 240 may gradually decrease the boosted output voltage to a second voltage value which is lower than the first voltage value for a second time interval (703) after the first time interval (701). In this instance, the preset period may be a sum of the first and second time intervals. In addition, the converter unit 240 may include at least one of a diode or a capacitor to control the output voltage, as shown in FIG. 7C.

Figure 8A:
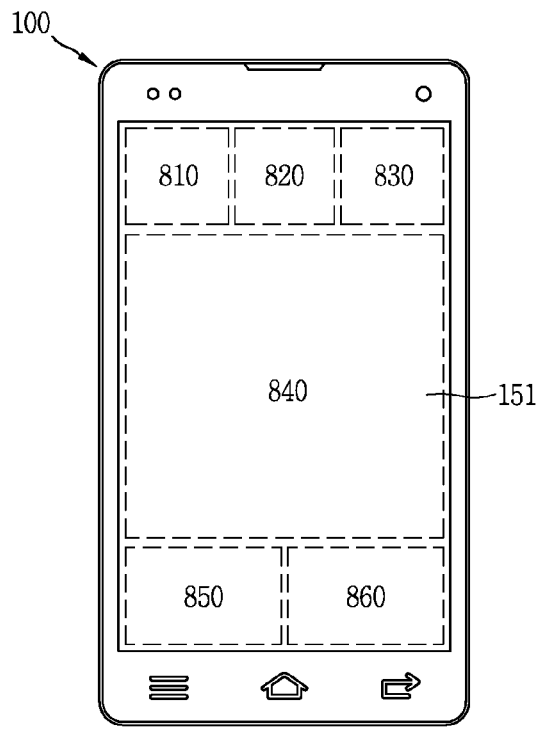
FIGS. 8A, 8B, and 8C are diagrams illustrating execution of an application which is mapped to a region where a touch input is applied in a state that the display unit is in an inactive state in a mobile terminal according to an embodiment of the present invention.
Figure 8B:
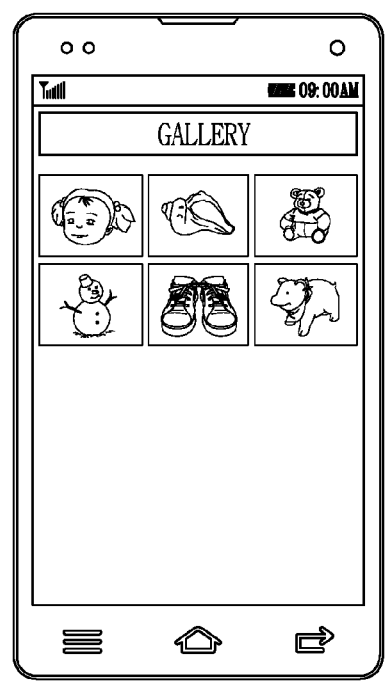
Figure 8C:
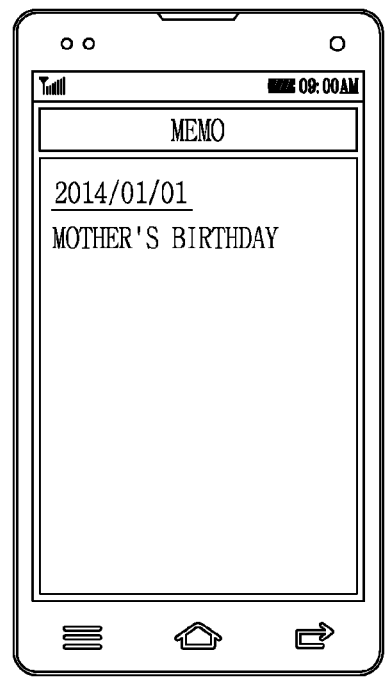

FIGS. 8A, 8B, and 8C are diagrams illustrating execution of an application which is mapped to a region where a touch input is applied in a state that the display unit is in an inactive state in a mobile terminal according to an embodiment of the present invention.

Referring to FIG. 8A, the controller 80 may divide the display unit 151 into at least one region (810 through 860). Further, the controller 180 may map a specific application to the at least one region. In addition, the controller 180 may store information associated with the mapped application to the divided region of the display unit 151 to a memory 170.

Further, referring to FIGS. 8A and 8C, when a preset type touch input is applied to one region among the divided regions of the display unit 151, in a state that the liquid crystal panel 230 of the display unit 151 is inactivated, the controller 180 may execute a specific application which has been mapped to the touched one region.

For instance, as shown in FIG. 8B, when a preset type touch input is applied to one (810) of the divided regions of the display unit 151, the controller 180 may execute a gallery application. In another embodiment, as shown in FIG. 8C, when a preset type touch input is applied to one (820) of the divided regions of the display unit 151, the controller 180 may execute a memo application. For example, the preset touch input may be one of a long press, a double tap, a drag or a flicking which is applied to the display unit 151.

Figure 9A:
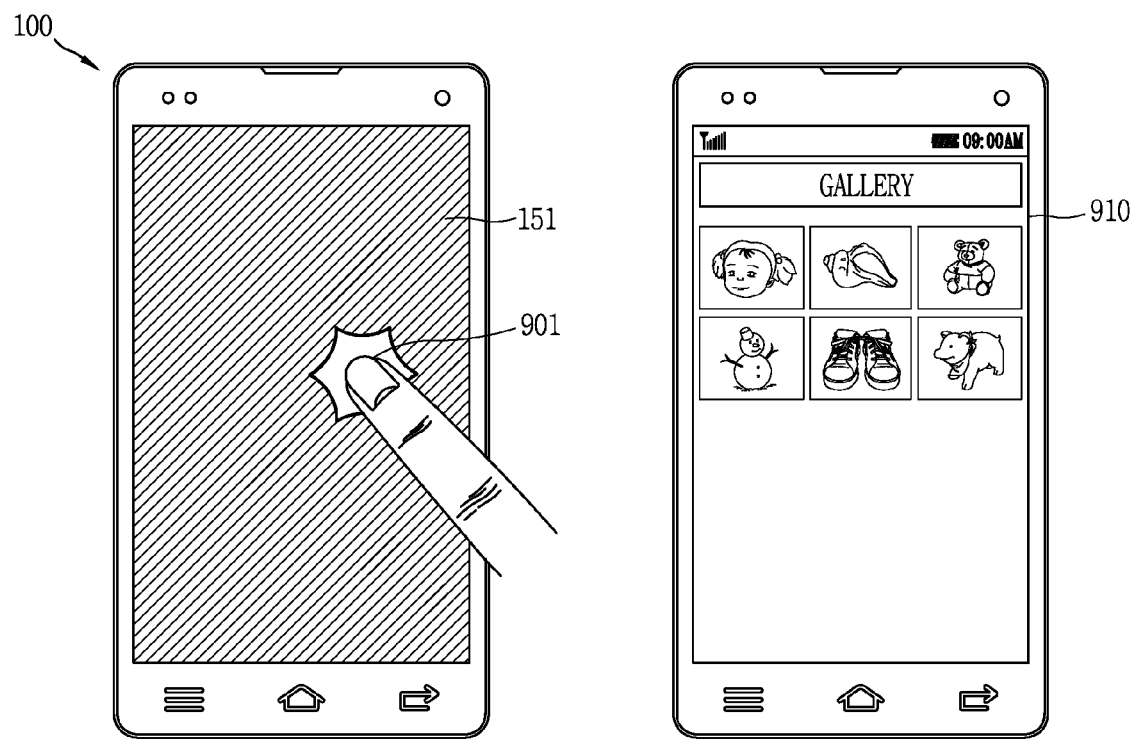
FIGS. 9A and 9B are diagrams illustrating execution of an application corresponding to an object which applies a touch input in a state that the display unit is in an inactive state in a mobile terminal according to an embodiment of the present invention.
Figure 9B:
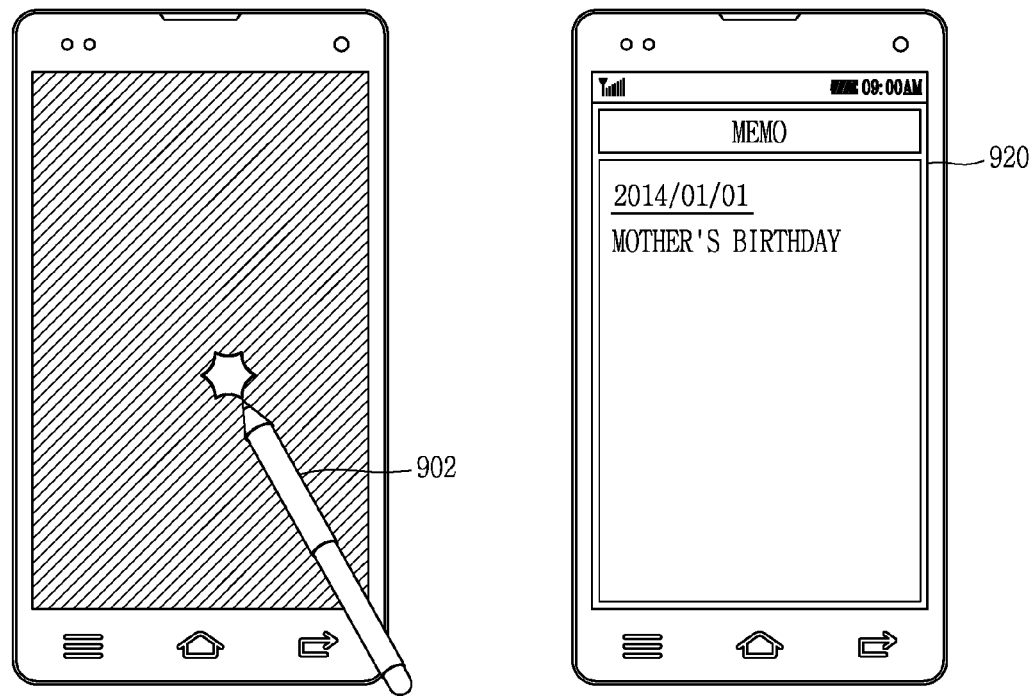

FIGS. 9A and 9B are diagrams illustrating execution of an application corresponding to an object which applies a touch input in a state that the display unit is in an inactive state in a mobile terminal according to an embodiment of the present invention.

Referring to FIGS. 9A and 9B, the touch controller 210 may distinguish an object which applies a touch input. Further, the controller 180 may execute a preset application corresponding to an object which is distinguished by the touch controller 210.

For example, the object which applies a touch input may include a finger, a stylus, a knuckle or a nail, but not limited thereto and may be applicable to any object which can be recognized by the touch sensor included in the sensing unit 140.

The controller 180 may map an object which applies a touch input when setting an application which is mapped to a specific region. That is, it is possible to map different applications by objects which apply a touch input to the same specific region.

Referring to FIG. 9A, when a user applies a touch input (901) to a specific region using his/her finger in a state that the liquid crystal panel 230 of the display unit 151 is inactivated, the controller 180 may execute a gallery application 910 that is displayed on the display unit.

Referring to FIG. 9B, when a user applies a touch input (902) to a specific region using a stylus in a state that the liquid crystal panel 230 of the display unit 151 is inactivated, the controller 180 may execute a memo application 920 that is displayed on the display unit.

Though not shown in FIGS. 9A and 9B, the controller 180 may detect information associated with a user's body part that contacts a specific region of the display unit 151 in a state that the liquid crystal panel 230 of the display unit 151 is inactivated. Thus, the controller 180 may map a plurality of applications with respect to the same region based on the information associated with the user's body part.

According to one embodiment of the present invention, the controller 180 may map an application by the type of a touch input using the object. For instance, when the object applying a touch input is a finger, it is possible to map different applications with respect to a single touch and a double touch to the same specific region. As a result, since a user can map more applications to the limited touch screen region, various applications may be more conveniently executed though the liquid crystal panel of the display unit that is inactivated.

Figure 10A:
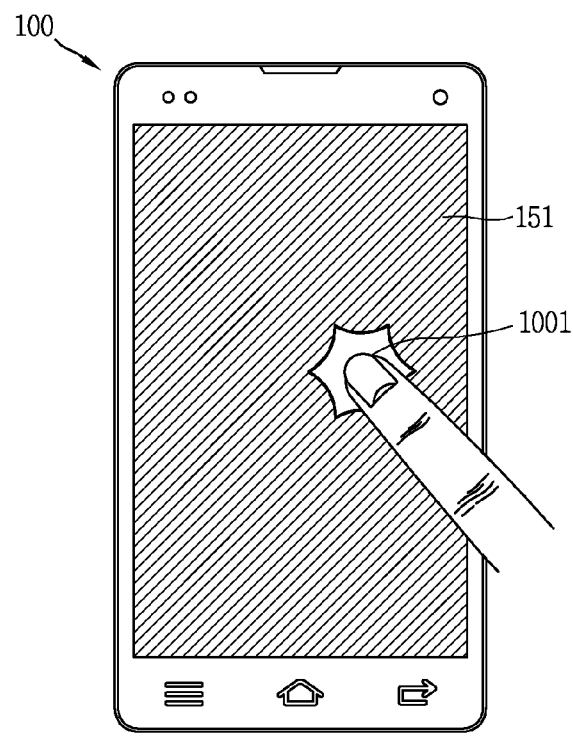
FIGS. 10A, 10B, and 10C are diagrams illustrating execution of fingerprint certification using a touch input which is applied in a state that the display unit is in an inactive state in a mobile terminal according to an embodiment of the present invention.
Figure 10B:
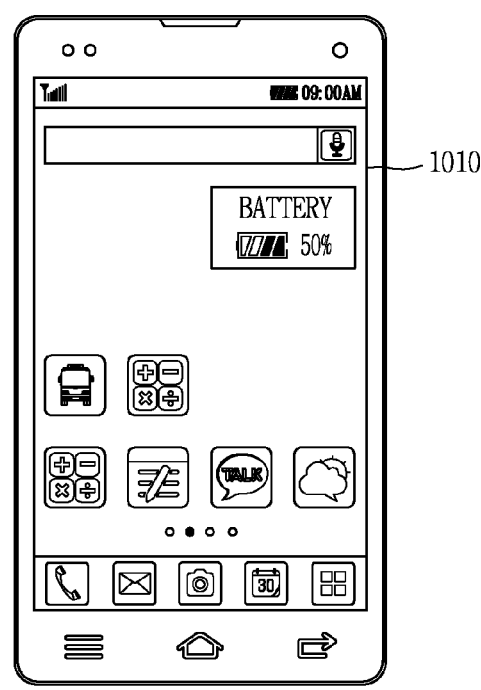
Figure 10C:
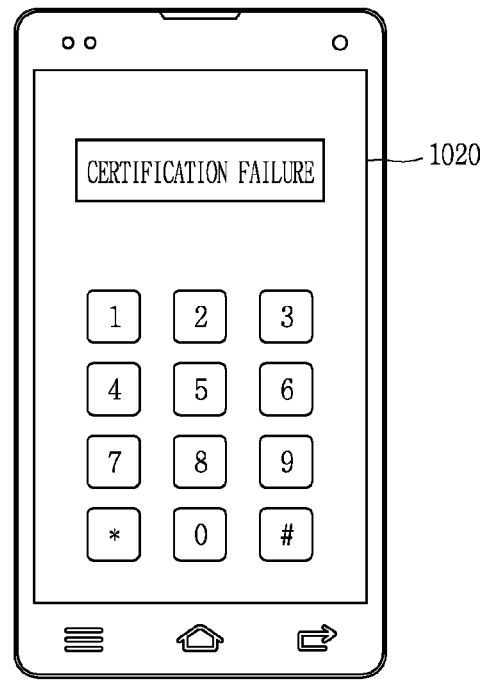

FIGS. 10A, 10B, and 10C are diagrams illustrating execution of fingerprint certification using a touch input which is applied in a state that the display unit is in an inactive state in a mobile terminal according to an embodiment of the present invention.

Referring to FIG. 10A, the touch controller 210 may detect user's fingerprint information, using a touch input (1001) applied to the display unit 151. Further, the controller 180 may execute a user certification, using the detected fingerprint information.

That is, the controller 180 may recognize the user's fingerprint when a touch input (1001) is applied, and then execute a certification for the fingerprint. To this end, the mobile terminal 100 may include a fingerprint recognition sensor for recognizing a user's fingerprint. The controller 180 may use fingerprint information sensed by the fingerprint sensor as a certification means. As an example, the fingerprint recognition sensor may be installed within the touch screen 151.

Next, referring to FIGS. 10B and 10C, the controller 180 may execute a user certification using the detected fingerprint information and perform a preset control command based on the certification result. In particular, as shown in FIG. 10B, when a fingerprint certification is successful using a touch input (1001) applied to the display unit 151 in a state that the liquid crystal panel 230 of the display unit 151 is inactivated, the controller 180 may output a home screen (1010) to the display unit 151. Though not shown in FIG. 10B, when the fingerprint recognition is successful, the controller 180 may execute an application which is mapped to one region of the display unit 151 to which the touch input is applied.

Referring to FIG. 10C, when the fingerprint recognition fails, the controller 180 may output a screen (1020) associated with the fingerprint recognition result. Further, the screen (1020) may include a guide image which guides a user to input a password.

Meanwhile, when a certification procedure is added to a specific application in connection with the embodiment of the present invention, the controller 180 may not execute the specific application when the fingerprint certification fails, though a user selects the specific region where the specific application is mapped. In this instance, the controller 180 may indicate a notification window indicating that a fingerprint certification failed.

In one embodiment, the controller 180 may set a specific region as a fingerprint certification region. When a user's touch input is maintained to the fingerprint certification region for a predetermined time, the controller 180 may perform a fingerprint certification. When a fingerprint is certified, the controller 180 may activate the liquid crystal panel 230 which is in an inactive state and directly cause displaying of a home screen.

In one embodiment, the controller 180 may set a specific region as a speed dial calling region. When a user's touch input is maintained for a predetermined time, the controller 180 may perform a fingerprint certification. When a fingerprint is certified, the controller 180 may activate the liquid crystal panel 230 which is in an inactive state and attempt to call the set number.

FIGS. 11A-12C are diagrams illustrating a method to map an application with respect to a specific region of the display unit which is in an inactive state in the mobile terminal according to an embodiment of the present invention.

Figure 11A:
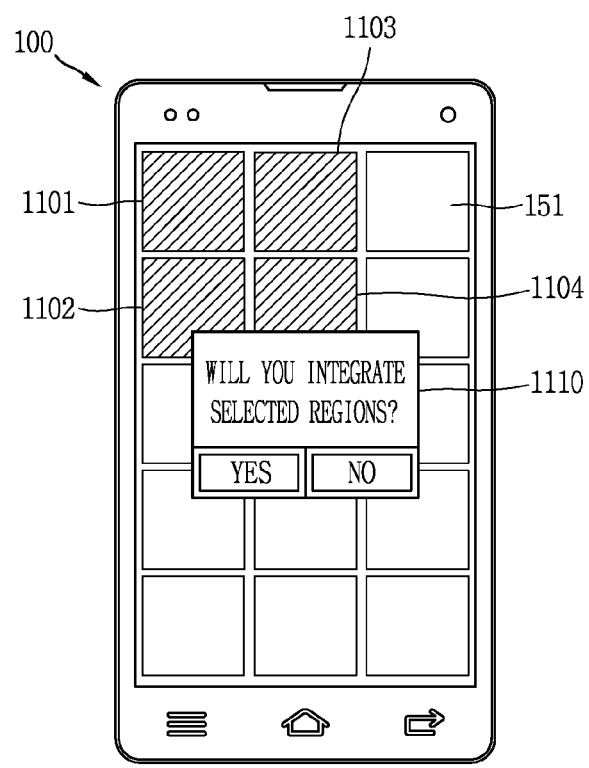
FIGS. 11A, 11B, 12A, 12B, and 12C are diagrams illustrating a method to map an application with respect to a specific region of the display unit which is in an inactive state in a mobile terminal according to an embodiment of the present invention.

Referring to FIG. 11A, the controller 180 may display a screen that sets an application mapped to a specific region. The controller 180 may divide the screen into a plurality of setting regions for setting a specific region.

When a user selects regions (1101 through 1104) to be set as a specific region among the plurality of setting regions, the controller 180 may indicate that the regions (1101 through 1104) are selected. For instance, the controller 180 may indicate the selected regions (1101 through 1104) in a specific color, as shown in FIG. 11A, but not limited thereto and any other indication may be applicable if it is distinguishable over other setting regions.

Figure 11B:
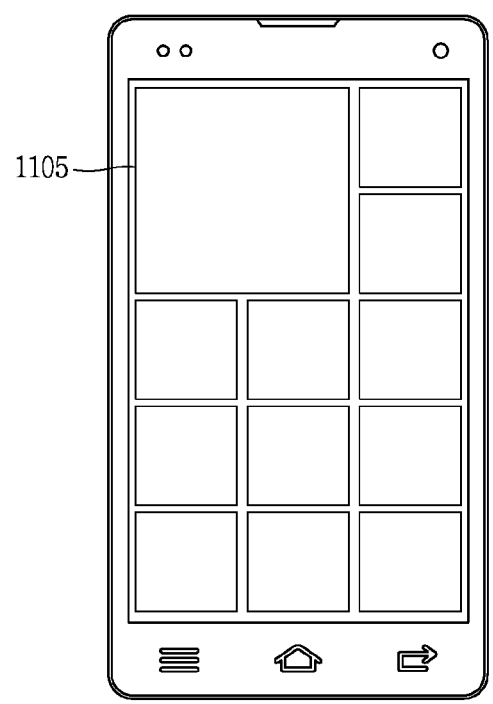

The controller 180 may indicate a notification window (1110) to inquire whether or not the selected regions (1101 through 1104) are integrated. When a user selects integration, the controller 180 may display a setting region (1105) which are integrated by the selected regions (1101 through 1104), as shown in FIG. 11B. The controller 180 may set the setting region (1105) as a specific region.

Figure 12A:
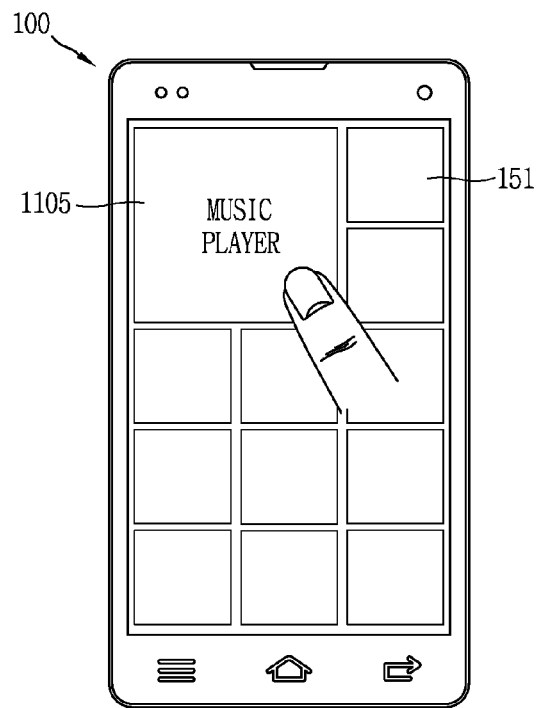
Figure 12B:
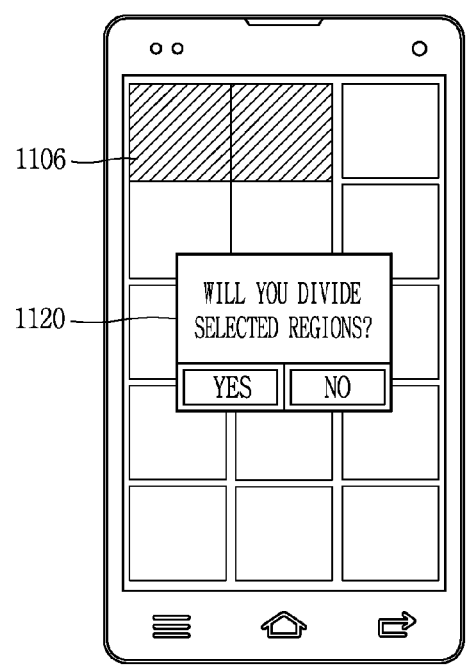
Figure 12C:
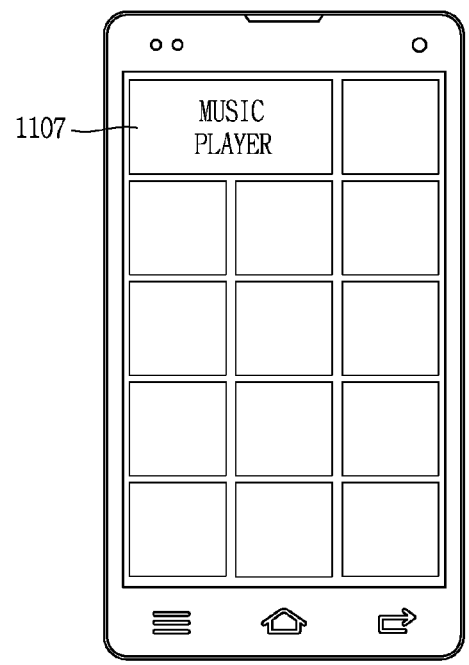

FIGS. 12A, 12B, and 12C are diagrams illustrating that a music playback application is mapped to an integrated setting region (1105).

Referring to FIG. 12A, when a user selects the integrated setting region (1105), the controller 180 may display the integrated setting region (1105) as the setting region before integration. When a user selects a new region (1106) within the integrated setting region (1105), as shown in FIG. 12B, the controller 180 may display the new region (1106) distinguishably from other regions.

The controller 180 may display a notification window (1120) to inquire whether or not the integrated setting region (1105) is divided. When a user selects division, the controller 180 may display the divided screen (1106), as shown in FIG. 12B. The controller 180 may set the setting region (1106) as a specific region. Thus, a user can easily set the number, size and position of the specific region which is mapped to the application, as desired.

As described hereinbefore, according to an embodiment of the present invention, it is possible to reduce power consumption of an in-cell type display unit by inactivating at least one of the converter unit, the touch controller, the driving unit or the controller when the liquid crystal panel is in an inactive state.

Further, the in-cell type display unit can detect whether or not a touch input is applied to a liquid crystal panel which is in an inactive state and coordinate information of the touch input, even if part of the components of the display unit is inactivated.

Further, it is possible to reduce the time required to detect a touch input by executing an activation control of the converter unit using partial components of the display unit without activating the inactivated controller. Furthermore, it is possible to prevent a failed operation which may occur due to a low-power driving mode of the in-cell display unit from being generated.

In addition, according to at least one embodiments of the present invention, when a predetermined touch input is applied to a specific region of the touch screen in the sleep mode, it is possible to immediately execute an application which is mapped to a specific region.

Various embodiments may be implemented using a machine-readable medium having instructions stored thereon for execution by a processor to perform various methods presented herein. Examples of possible machine-readable mediums include HDD(Hard Disk Drive), SSD (Solid State Disk), SDD(Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless alternatively specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a display including a touch sensor having a first sensor and a second sensor, wherein the display is configured as an in-cell touch type touch screen;
    a touch controller configured to detect a touch input received at the display in a state that a lighting of the display is turned off;
    a driving unit including a driving integrated circuit (IC) and a one time programmable (OTP) memory and capable of supplying power to drive the display, wherein the OTP memory stores setting information associated with an initialization operation of the driving unit;
    a converter unit capable of supplying an output voltage to the driving unit;
    an input/output port directly connecting the touch controller and the converter unit; and
    a controller configured to control the mobile terminal in combination with at least one of the display, the touch controller, or the driving unit,
    wherein the driving unit, the converter unit, and the controller are in an inactive state when the lighting of the display is turned off,
    wherein the touch controller is capable of:
        sensing the touch input received at the display using the first sensor in the state that the lighting of the display is turned off and the controller is in the inactive state;
        generating a signal for activating the converter unit when the touch input is sensed;
        transmitting the generated signal to the converter unit via the input/output port;
        causing the converter unit to enter an active state from the inactive state such that the converter unit performs the initialization operation using the setting information stored in the OTP memory;
        applying the output voltage to the driving unit via the converter unit;
        causing the driving unit to be in an active state in response to the applied output voltage; and
        detecting touch coordinates of the touch input using the first and second sensors together, and
    wherein the controller remains in the inactive state when the converter unit and the driving unit are activated in response to the touch input.

2. The mobile terminal of claim 1, wherein a pulse voltage is applied to only the first sensor when the driving unit is in the inactive state.

3. The mobile terminal of claim 2, wherein a pulse voltage is applied to both the first and second sensors when the driving unit enters the active state from the inactive state.

4. The mobile terminal of claim 3, wherein a pulse voltage of the first sensor is applied by the touch controller, and a pulse voltage of the second sensor is applied by the driving unit, which enters the active state, based on sensing of the touch input using the first sensor.

5. The mobile terminal of claim 1, wherein:
    the display is turned on in response to a user gesture including at least the touch input; and
    the touch controller is further configured to determine whether the user gesture is applied based on coordinate information of the touch input and coordinate information of at least one second touch input that is applied while the display is off.

6. The mobile terminal of claim 5, wherein:
    each of the touch input and the at least one second touch input is a tapping applied to the display; and
    the user gesture is specified based on at least one of a region of the display where the tapping is applied, a time interval between each of a plurality of tapping, or a number of the plurality of tapping.

7. The mobile terminal of claim 5, wherein the controller is further configured to be operated in a sleep mode when the lighting of the display is turned off, and to enter an active mode in response to the user gesture.

8. The mobile terminal of claim 7, wherein the controller is further configured to turn on the lighting of the display upon entering the active mode.

9. The mobile terminal of claim 7, wherein:
    the user gesture includes a plurality of user gestures which are specified by a position where the touch input and the at least one second touch input are applied; and
    the controller is further configured to:
        execute a first application when a first user gesture among the plurality of user gestures is applied; and
        execute a second application when a second user gesture among the plurality of user gestures is applied.

10. The mobile terminal of claim 1, wherein:
    the driving unit includes a memory in which initialization setting information associated with an initialization operation of the driving unit is stored; and
    the driving unit is further configured to perform the initialization operation using the initialization setting information stored in the memory upon entering the active state when the touch input is recognized by the touch controller.

11. A method for controlling a mobile terminal including a display configured as an in-cell touch type touch screen having a first touch sensor, a second touch sensor, a touch controller, and a driving unit, wherein the mobile terminal further includes:
- a controller configured to control the mobile terminal in combination with at least one of the display, the touch controller, or the driving unit;
- a converter unit capable of supplying an output voltage to the driving unit; and
- an input/output port directly connecting the touch controller and the converter unit, and wherein the driving unit, the converter unit, and the controller are in an inactive state when a lighting of the display is turned off, wherein the driving unit includes a driving integrated circuit (IC) and a one time programmable (OTP) memory storing setting information associated with an initialization operation of the driving unit, the method comprising:
- sensing, by the touch controller, a touch input received at the display in a state that the lighting of the display is turned off and the controller is in the inactive state, using the first touch sensor;
- generating a signal for activating the converter unit when the touch input is sensed;
- transmitting the generated signal to the converter unit;
- causing the converter unit to enter an active state from the inactive state such that the converter unit performs the initialization operation using the setting information stored in the OTP memory;
- applying the output voltage to the driving unit via the converter unit;
- causing, by the touch controller, the driving unit to be in an active state in response to the applied output voltage; and
- detecting coordinates of the touch input using the first and second touch sensors together, wherein the controller remains in the inactive state when the converter unit and the driving unit are activated in response to the touch input.

12. The method of claim 11, further comprising:
- determining whether a user gesture is applied based on coordinate information of the touch input and coordinate information of at least one second touch input that is applied to the display while the display is off; and
- turning on the lighting of the display in response to the user gesture.

13. The method of claim 12, further comprising:
- operating the controller in a sleep mode when the driving unit enters an inactive mode; and
- causing the controller in the sleep mode to enter an active mode in response to the user gesture.

14. The mobile terminal of claim 1, wherein the controller operably coupled to the touch controller is directly coupled to the converter unit that is directly coupled to the driving unit.

15. The mobile terminal of claim 14, wherein the touch controller transmits the generated signal directly to the converter unit without activating the controller.

* * * * *